United States Patent
Tavildar et al.

(10) Patent No.: US 10,498,503 B2
(45) Date of Patent: Dec. 3, 2019

(54) MULTI-CAST RESOURCE ALLOCATION BY AGGREGATION LEVEL

(71) Applicant: QUALCOMM Incorporated, San Diego, CA (US)

(72) Inventors: Saurabha Tavildar, Jersey City, NJ (US); Jamie Menjay Lin, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 15/266,836

(22) Filed: Sep. 15, 2016

(65) Prior Publication Data

US 2017/0230154 A1 Aug. 10, 2017

Related U.S. Application Data

(60) Provisional application No. 62/293,656, filed on Feb. 10, 2016.

(51) Int. Cl.
*H04W 72/04* (2009.01)
*H04L 5/00* (2006.01)
*H04W 72/12* (2009.01)

(52) U.S. Cl.
CPC .......... *H04L 5/0037* (2013.01); *H04L 5/0046* (2013.01); *H04W 72/042* (2013.01); *H04W 72/121* (2013.01)

(58) Field of Classification Search
CPC ... H04L 5/0037; H04L 5/0044; H04L 5/0046; H04L 5/0048; H04L 5/0053; H04W 72/0406; H04W 72/042; H04W 72/121
See application file for complete search history.

(56) References Cited

U.S. PATENT DOCUMENTS

| 9,407,412 | B2* | 8/2016 | Guan | H04W 72/1289 |
| 9,572,148 | B2* | 2/2017 | Park | H04L 5/0037 |
| 9,591,642 | B2* | 3/2017 | Wang | H04L 5/003 |

(Continued)

OTHER PUBLICATIONS

International Search Report and Written Opinion—PCT/US2017/012479—ISA/EPO—dated Apr. 5, 2017.

(Continued)

*Primary Examiner* — Kevin D Mew
(74) *Attorney, Agent, or Firm* — Qualcomm IP Dept.; James Hunt Yancey, Jr.

(57) ABSTRACT

Multicasting resource allocation information per aggregation level is enabled. A device allocates resources to UEs according to aggregation level. At each level, a control message includes a bitmap, where each bit corresponds to a different resource, an array, and an ID field for dynamic mapping to the bitmap. The placement order value of an ID in the field is stored at locations in the array. The index value for those locations in the array identifies which asserted bits in the bitmap correspond to the resource allocation for a UE at the level. The control message is multicast to the UEs specified at the aggregation level. The bitmap may have the same length at each level, or have reducing length at lower levels with the removal of bits already asserted at higher levels. The UE reconstructs the bitmap from the higher level bitmaps and the bitmap for the current level.

30 Claims, 8 Drawing Sheets

(56) References Cited

U.S. PATENT DOCUMENTS

| | | | |
|---|---|---|---|
| 9,686,782 B2* | 6/2017 | Papasakellariou | H04L 5/0053 |
| 9,686,798 B1* | 6/2017 | Zhao | H04W 72/1257 |
| 9,723,606 B2* | 8/2017 | Seo | H04L 1/1861 |
| 2010/0157922 A1* | 6/2010 | Kim | H04L 5/0053 370/329 |
| 2010/0279628 A1* | 11/2010 | Love | H04L 5/003 455/70 |
| 2011/0256861 A1* | 10/2011 | Yoo | H04L 5/005 455/423 |
| 2011/0274079 A1* | 11/2011 | Lee | H04L 5/0007 370/329 |
| 2012/0252447 A1 | 10/2012 | Sartori et al. | |
| 2013/0003604 A1 | 1/2013 | Blankenship et al. | |
| 2013/0039291 A1 | 2/2013 | Blankenship et al. | |
| 2013/0128826 A1* | 5/2013 | Lin | H04L 1/1861 370/329 |
| 2013/0242906 A1* | 9/2013 | Li | H04L 5/0053 370/329 |
| 2013/0265944 A1* | 10/2013 | Frenne | H04L 1/0031 370/329 |
| 2014/0092830 A1* | 4/2014 | Chen | H04W 72/042 370/329 |
| 2014/0092836 A1* | 4/2014 | Park | H04L 1/0038 370/329 |
| 2014/0211730 A1* | 7/2014 | Seo | H04L 5/0053 370/329 |
| 2014/0293924 A1* | 10/2014 | Wang | H04W 72/042 370/329 |
| 2014/0369293 A1* | 12/2014 | Guo | H04L 5/0073 370/329 |
| 2015/0016312 A1* | 1/2015 | Li | H04W 74/0833 370/280 |
| 2015/0029984 A1* | 1/2015 | Wang | H04L 5/003 370/329 |
| 2015/0092692 A1* | 4/2015 | Kim | H04L 5/0016 370/329 |
| 2015/0208390 A1* | 7/2015 | Zhao | H04W 72/042 370/330 |
| 2015/0237459 A1 | 8/2015 | Webb et al. | |
| 2015/0257086 A1* | 9/2015 | Jiang | H04W 48/08 370/329 |
| 2015/0271839 A1* | 9/2015 | She | H04L 1/1829 370/329 |
| 2015/0282208 A1 | 10/2015 | Yi et al. | |
| 2015/0334698 A1 | 11/2015 | Park et al. | |
| 2016/0043849 A1* | 2/2016 | Lee | H04L 5/0053 370/329 |
| 2016/0073339 A1* | 3/2016 | Tabet | H04L 1/0003 370/311 |
| 2016/0134458 A1* | 5/2016 | Xia | H04L 5/0053 370/329 |
| 2016/0302174 A1* | 10/2016 | Chatterjee | H04B 7/0486 |
| 2017/0033901 A1* | 2/2017 | Tavildar | H04L 5/0035 |
| 2017/0135084 A1* | 5/2017 | Kuchibhotla | H04L 5/0007 |
| 2017/0201982 A1* | 7/2017 | Rico Alvarino | H04W 72/042 |
| 2017/0230994 A1* | 8/2017 | You | H04W 72/042 |

OTHER PUBLICATIONS

NEC Group: "Search Space Design and RE mapping for the Non-interleaved R-PDCCH transmission with CRS and DMRS," 3GPP Draft; R1-104534 Search Space Design for Non-Interleaved R-PDCCHS with CRS and DMRS, 3rd Generation Partnership Project (3GPP), Mobile Competence Centre; 650, Route Des Lucioles; F-06921 Sophia-Antipolis Cedex; France, vol. RAN WG1, No. Madrid, Spain; Aug. 23, 2010-Aug. 27, 2010, Aug. 17, 2010, XP050598596, [retrieved on Aug. 17, 2010] paragraph [02.1].

* cited by examiner

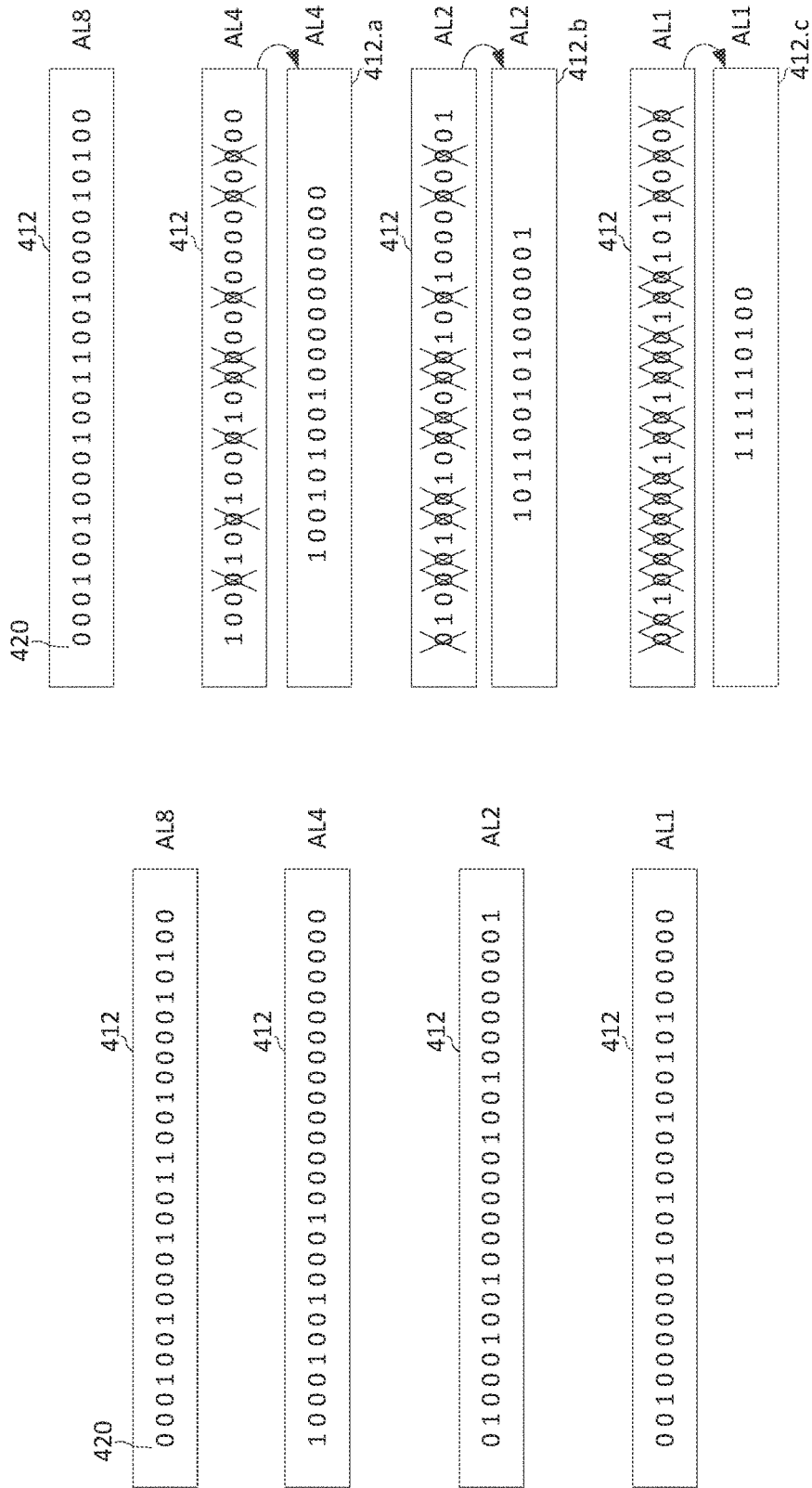

MULTI-CAST RESOURCE ALLOCATION BY AGGREGATION LEVEL

CROSS REFERENCE TO RELATED APPLICATIONS

The present application claims priority to and the benefit of the U.S. Provisional Patent Application No. 62/293,656, filed Feb. 10, 2016, which is hereby incorporated by reference in its entirety as if fully set forth below in its entirety and for all applicable purposes.

TECHNICAL FIELD

Aspects of the present disclosure relate generally to wireless communication systems, and more particularly, to multi-cast resource allocation information using aggregation level-based multi-cast control channel design.

INTRODUCTION

In wireless communication networks, resources (e.g., symbol, frequency, and/or code resources) are allocated to a user equipment (UE) and then communicated to that UE via downlink control channels (e.g., via the physical downlink control channel, or PDCCH). Presently, allocation information specific to the UE (e.g., modulation coding scheme (MCS), resource allocation type, coding rate, resource elements, etc.) is signaled to the UE with downlink control information (DCI) messages that are specific to the UE. Thus, as more UEs come in use in a given area, the scheduling and overhead demands for signaling that scheduling increases.

As a result, there is a need for techniques to allow resource allocation information to be signaled to UEs in a manner that reduces the overhead to do so as well as improves the efficiency.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method is provided that includes generating, by an access point, a first downlink control message comprising a first set of resource allocations to a first plurality of wireless communications devices based on the first plurality of wireless communications devices being assigned to a first aggregation level. The method further includes generating, by the access point, a second downlink control message comprising a second set of resource allocations to a second plurality of wireless communications devices based on the second plurality of wireless communications devices being assigned to a second aggregation level that is different from the first aggregation level. The method further includes transmitting, from the access point, the first downlink control message to the first plurality of wireless communications devices and the second downlink control message to the second plurality of wireless communications devices.

In an additional aspect of the disclosure, a method is provided that includes receiving, at a wireless communications device, a multicast downlink control message sent to a plurality of wireless communications devices including the wireless communications device according to a first aggregation level from an access point. The method further includes extracting, by the wireless communications device, a resource allocation by the access point for the wireless communications device from among a plurality of resource allocations to the plurality of wireless communications devices in the multicast downlink control message. The method further includes wherein the first aggregation level is one from among a plurality of different aggregation levels, the resource allocation based on the wireless communications device being assigned to the aggregation level.

In an additional aspect of the disclosure, an apparatus is provided that includes a processor configured to generate a first downlink control message comprising a first set of resource allocations to a first plurality of wireless communications devices based on the first plurality of wireless communications devices being assigned to a first aggregation level. The processor is further configured to generate a second downlink control message comprising a second set of resource allocations to a second plurality of wireless communications devices based on the second plurality of wireless communications devices being assigned to a second aggregation level that is different from the first aggregation level. The apparatus further includes a transceiver configured to transmit the first downlink control message to the first plurality of wireless communications devices and the second downlink control message to the second plurality of wireless communications devices.

In an additional aspect of the disclosure, an apparatus is provided that includes a transceiver configured to receive a multicast downlink control message to a plurality of wireless communications devices including the apparatus according to an aggregation level from an access point. The apparatus further includes a processor configured to extract a resource allocation by the access point for the apparatus from among a plurality of resource allocations to the plurality of wireless communications devices in the multicast downlink control message. The apparatus further includes wherein the aggregation level is one from among a plurality of different aggregation levels, the resource allocation based on the wireless communications device being assigned to the aggregation level.

In an additional aspect of the disclosure, a computer readable medium having program code recorded thereon is provided, the program code including code for causing an access point to generate a first downlink control message comprising a first set of resource allocations to a first plurality of wireless communications devices based on the first plurality of wireless communications devices being assigned to a first aggregation level. The program code further includes code for causing the access point to generate a second downlink control message comprising a second set of resource allocations to a second plurality of wireless communications devices based on the second plurality of wireless communications devices being assigned to a second aggregation level that is different from the first aggregation level. The program code further includes code for causing the access point to transmit the first downlink control message to the first plurality of wireless communications devices and the second downlink control message to the second plurality of wireless communications devices.

In an additional aspect of the disclosure, a computer readable medium having program code recorded thereon is provided, the program code including code for causing a wireless communications device to receive a multicast downlink control message to a plurality of wireless communications devices including the wireless communications device according to an aggregation level from an access point. The program code further includes code for causing the wireless communications device to extract a resource allocation by the access point for the wireless communications device from among a plurality of resource allocations to the plurality of wireless communications devices in the multicast downlink control message. The program code further includes wherein the aggregation level is one from among a plurality of different aggregation levels, the resource allocation based on the wireless communications device being assigned to the aggregation level.

In an additional aspect of the disclosure, an apparatus is provided that includes means for generating a first downlink control message comprising a first set of resource allocations to a first plurality of wireless communications devices based on the first plurality of wireless communications devices being assigned to a first aggregation level. The apparatus further includes means for generating a second downlink control message comprising a second set of resource allocations to a second plurality of wireless communications devices based on the second plurality of wireless communications devices being assigned to a second aggregation level that is different from the first aggregation level. The apparatus further includes means for transmitting the first downlink control message to the first plurality of wireless communications devices and the second downlink control message to the second plurality of wireless communications devices.

In an additional aspect of the disclosure, an apparatus is provided that includes means for receiving a multicast downlink control message to a plurality of wireless communications devices including the apparatus according to an aggregation level from an access point. The apparatus further includes means for extracting a resource allocation by the access point for the apparatus from among a plurality of resource allocations to the plurality of wireless communications devices in the multicast downlink control message. The apparatus further includes wherein the aggregation level is one from among a plurality of different aggregation levels, the resource allocation based on the wireless communications device being assigned to the aggregation level.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5A is a flowchart illustrating bitmap structure per aggregation level according to embodiments of the present disclosure.

FIG. 5B is a flowchart illustrating bitmap structure per aggregation level according to embodiments of the present disclosure.

DETAILED DESCRIPTION

Figure 1:
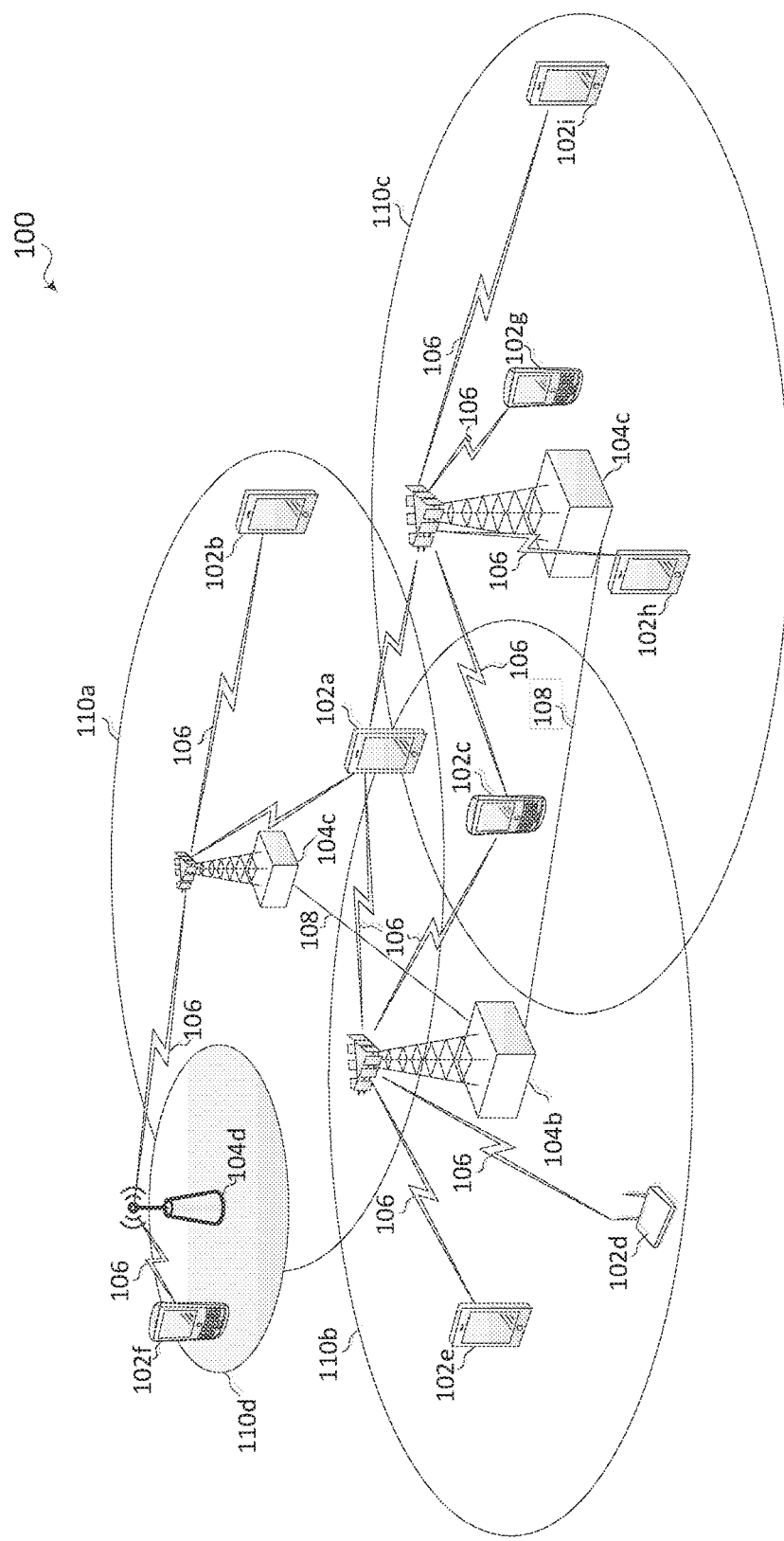
FIG. 1 illustrates an exemplary wireless communication environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA, LTE networks, GSM networks, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-DI-DMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network.

Further, devices may also communicate with one another using various peer-to-peer technologies such as LTE-Direct (LTE-D), Bluetooth, Bluetooth Low Energy (BLE), ZigBee, radiofrequency identification (RFID), and/or other ad-hoc or mesh network technologies. Embodiments of this disclosure are directed to any type of modulation scheme that may be used on any one or more of the above-recited networks and/or those yet to be developed.

Embodiments of the present disclosure introduce systems and techniques to multi-cast resource allocation information using aggregation level-based multi-cast control channel design. In an embodiment, a scheduler (such as a base station) may allocate resource elements (e.g., for downlink and/or uplink) to one or more UEs according to aggregation level, instead of per UE. To accomplish this, a base station may group UEs according to their aggregation levels and generate a multi-cast downlink control message, where each multi-cast message is sent to those UEs that are aggregated into that group, such that a first multi-cast message is sent to a first group of UEs at a first aggregation level and a second multi-cast message is sent to a second group of UEs at a second aggregation level, etc. The UEs may not know beforehand which group they are aggregated into by the base station, resulting in dynamic aggregation level grouping.

When the base station determines the UEs that are to be scheduled at a certain aggregation level, the base station identifies each available resource in a bitmap, where each bit in the bitmap corresponds to a different resource available for scheduling. The base station asserts those bits in the bitmap that correspond to resources to be allocated to UEs in that aggregation level. The base station also creates an array that is equal in length to the number of bits asserted in the bitmap for the aggregation level. The array provides a dynamic mapping between the identifiers of the UEs in the aggregation level and the asserted bits in the bitmap, so that less space may be used to establish the allocations.

The base station also creates a UE identifier list that lists each UE scheduled and allocated resources at the aggregation level. The placement order values from the UE identifier list is the value stored in specific array elements. When a UE searches the array for the placement order value of its particular UE identifier, the index values associated with the array elements where the placement order values are located are used to identify which asserted bits have been allocated to that UE. Thus, the index value specifies how many asserted bits in the bitmap corresponds to the asserted bit (and resource) assigned to the UE. This information is included in the downlink control message and multicast to the UEs.

The UE receives the downlink control message per aggregation level, and follows an order (e.g., the reverse order) to access the mapping to the allocated resources. In some embodiments, the bitmap size for each aggregation level is kept the same, so that the UEs at each aggregation level have clear access to the bitmap-resource associations. In other embodiments, the bitmap size for each aggregation level decreases down each level. The decrease results from the bits asserted in the upper aggregation levels being removed for transmission of the bitmap at the current aggregation level. The UEs listen to upper aggregation levels as well as their own to obtain a full view of the bitmap, thus reducing the transmission size overhead while still allowing the UEs to have the appropriate information to obtain their resource allocations.

FIG. 1 illustrates a wireless communication network 100 in accordance with various aspects of the present disclosure. The wireless communication network 100 may include a number of UEs 102, as well as a number of base stations 104. The base stations 104 may include an evolved Node B (eNodeB). A base station 104 may also be referred to as an access point, base transceiver station, a node B, eNB, etc. A base station 104 may be a station that communicates with the UEs 102.

The base stations 104 communicate with the UEs 102 as indicated by communication signals 106. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104. The base stations 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, a drone, an entertainment device, a hub, a gateway, an appliance, a wearable, peer-to-peer and device-to-device components/devices (including fixed, stationary, and mobile), Internet of Things (IoT) components/devices, and Internet of Everything (IoE) components/devices, etc. The wireless communication network 100 is one example of a network to which various aspects of the disclosure apply.

Each base station 104 may provide communication coverage for a particular geographic area. In 3GPP, the term "cell" can refer to this particular geographic coverage area of a base station and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. And, a base station for a femto cell may be referred to as a femto base station or a home base station. In the example shown in FIG. 1, the base stations 104a, 104b and 104c are examples of macro base station for the coverage areas 110a, 110b and 110c, respectively (also referred to as cells herein). The base stations 104d and 104e are examples of pico and/or femto base stations for the coverage areas 110d and 110e, respectively. A base station 104 may support one or multiple (e.g., two, three, four, and the like) cells.

The wireless communication network 100 may also include relay stations. A relay station is a station that receives a transmission of data and/or other information from an upstream station (e.g., a base station, a UE, or the like) and sends a transmission of the data and/or other information to a downstream station (e.g., another UE, another base station, or the like). A relay station may also be a UE that relays transmissions for other UEs. A relay station may also be referred to as a relay base station, a relay UE, a relay, and the like. Some relays may also have UE capabilities/functionalities.

The wireless communication network 100 may support synchronous or asynchronous operation. For synchronous operation, the base stations 104 may have similar frame timing, and transmissions from different base stations 104 may be approximately aligned in time. For asynchronous operation, the base stations 104 may have different frame timing, and transmissions from different base stations 104 may not be aligned in time.

In some implementations, the wireless communication network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

According to embodiments of the present disclosure, resource allocation information for one or more UEs 102 is multicast to the UEs 102 per resource block, instead of individual transmissions per UE 102, according to the aggregation levels to which the different UEs 102 are grouped (e.g., dynamically by the base station 104). As used herein, an aggregation level refers to a mechanism by which wireless communications systems (e.g., LTE, LTE-A, etc.) may map downlink control information (DCI, also referred to herein as DCI messages or downlink control messages) to downlink control symbols. In particular, the aggregation level determines how many downlink resource elements in the control channel (e.g., control channel elements (CCEs) in the PDCCH) are used to send the DCI messages. In an embodiment, there may be 4 aggregation levels identified as aggregation levels 1, 2, 4, and 8.

As an example, each CCE may represent a group of resource elements that, in an embodiment, may include four resource elements (e.g., subcarriers). Further, each resource element (e.g., subcarrier) may support mapping 2 bits. As an example, a CCE may be a group of 9 resource element groups, so that a given CCE corresponds to a total of 36 resource elements (9 groups*4 resource elements per group) that can map a total of 72 bits (36 resource elements*2 bits per element). Each aggregation level may be associated with a different number of CCEs.

For example, aggregation level 1 may be associated with 1 CCE, meaning that a total of 72 bits may be available for mapping for a DCI. As another example, aggregation level 2 may be associated with 2 CCEs, meaning that a total of 144 bits (2 CCEs*36 resource elements*2 bits per element) may be available for mapping for a DCI after applying a code rate to the DCI. As another example, aggregation level 4 may be associated with 4 CCEs, meaning that a total of 288 bits (4 CCEs*36 resource elements*2 bits per element) may be available for mapping for a DCI after applying a code rate to the DCI. As another example, aggregation level 8 may be associated with 8 CCEs, meaning that a total of 576 bits (8 CCEs*36 resource elements*2 bits per element) may be available for mapping for a DCI after applying a code rate to the DCI. These are for illustration only. Other combinations may be defined and remain within the scope of the present disclosure. Further, as used herein, the aggregation levels may be selected based on environment conditions. For example, aggregation level 8 may be selected where some environment metric, such as signal-to-noise ratio (SNR), is significantly low, and be referred to as the highest aggregation level (where 8 is highest; if other levels come out that utilize more CCEs and thus can pack more bits, those would then receive the designation of "highest"). Where SNR is better, "lower" aggregation levels such as 4 or 2 (in that order from higher to lower) may be used. Where SNR is best, the "lowest" aggregation level (e.g., aggregation level 1 in the present example) may be used.

According to embodiments of the present disclosure, a scheduler (e.g., associated with a base station 104) may perform one or more operations related to allocating resource elements for transmitting and receiving data with UEs 102. Resource elements that may be scheduled include resource blocks (RBs), resource block groups (RBGs), and/or any other type of resource suitable for embodiments of the present disclosure. The scheduler determines which aggregation level to use for a given DCI format (e.g., downlink formats such as 1, 1A, 1B, 1C, 1D, 2, and 2A and uplink formats such as 0, 3, and 3A to name some examples; for simplicity of discussion, herein reference will be made generally to downlink formats though embodiments of the present disclosure may be applicable to both downlink and uplink formats). The scheduler may do so based upon different information, such as channel quality and/or UE identifier type. For example, if UE 102 has reported a poor channel quality, the scheduler may determine to use a more robustly coded DCI (e.g., rate matching bits, adding additional bits/redundancy checks to provider better forward error correction protection for the actual bits of the message, e.g. a set of bits for the message and additional bits for a cyclic redundancy check (CRC)). This would increase the bit length of the DCI, and therefore the scheduler may select a higher aggregation level to accommodate that length and desired level of robustness. The DCI messages may be used to signal resource allocation information such as modulation coding scheme (MCS), resource allocation type, coding rate, resource elements, etc.

Instead of sending the scheduled information (e.g., resource allocation information) via multiple unicast messages to the different UEs 102, as is normally the situation for dedicated UE identifiers, the scheduler may send multicast messages according to one or more aggregation levels. In particular, DCI messages for dedicated UE identifiers (e.g., cell radio network temporary identifier, or C-RNTI; this is exemplary only, as other types of identifiers could be used as well) may, according to embodiments of the present disclosure, be multicast to multiple UEs that have been grouped together per aggregation level. Further, grouping may be performed dynamically such that the UEs 102 are unaware of their group assignments before the messages are multicast.

For example, referring again to FIG. 1, the wireless communication network 100 includes multiple UEs 102 in communication with the different base stations 104. For example, in cell 110a, UEs 102a and 102b receive coverage from base station 104c. As illustrated, they are both near the edge of the cell 110a, and therefore may have lower SNR. As a result, the scheduler may schedule downlink control messages (that may identify scheduled PDSCH and/or PUSCH resources, for example) for both in higher aggregation levels, whether the same or different (e.g., one or both in aggregation levels 8 or 4, or some combination thereof). SNR may be affected by additional environmental factors than distance, and therefore even UEs 102 closer in distance to a given base station 104 may still be scheduled for downlink control messages at a higher aggregation level.

As another example, UEs 102a, 102c, 102d, and 102e are within the cell 110b and receive coverage from the base station 104b. Given their respective SNRs (and/or other channel quality information and/or priorities), the base station 104b may schedule the downlink control messages for the UEs 102c and 102e in a first aggregation level (e.g., 4) and the UEs 102a and 102d in a second aggregation level (e.g., 8) that is higher than the first aggregation level. As another example, UEs 102a, 102c, 102g, 102h, and 102i are within the cell 110c and receive coverage from the base station 104a. The base station 104c may schedule the downlink control messages for the UEs 102a and 102i at a highest aggregation level (e.g., 8), the UE 102c in a second, lower aggregation level (e.g., 4), the UE 102h in a third, lower aggregation level (e.g., 2), and the UE 102g in a lowest aggregation level (e.g., 1), based on their respective channel quality measurements. As will be recognized, these are exemplary for ease of illustration only.

Continuing with this illustration and focusing on cell 110c in particular, when scheduling the downlink control messages for the UEs 102a, 102c, 102g, 102h, and 102i, the base station 104c may perform different aspects of embodiments of the present disclosure. For example, having determined to schedule the downlink control messages for the UEs in different aggregation levels, the base station 104c may proceed with generating downlink control messages for the respective aggregation levels. Thus, having determined to schedule the downlink control messages for the UEs 102a and 102i in the highest aggregation level, the base station 104c may proceed with generating the downlink control message according to the selected aggregation level. A single downlink control message may provide resource allocation information (whether downlink or uplink, but downlink in this example).

According to embodiments of the present disclosure, the scheduler (here, base station 104c) may identify each available resource element, such as per RBG, and maintain/provide a bitmap where each bit corresponds to a different available RBG (the level of granularity used herein, though other levels of granularity may be similarly used). For example, the bitmap may be of a length that corresponds to the number of RBGs available for a given system bandwidth (e.g., 50 bits long for a 10 MHz system bandwidth, though other lengths are possible ranging from 10 bits or less to over 200 as just one example). The value of each bit may identify whether the RBG corresponding to that bit is scheduled or not—for example, a 0 may indicate the RBG has not been scheduled, while a 1 (also referred to as asserted herein) may indicate the RBG has been scheduled. Since each bit corresponds to a different RBG, and the UEs 102 have knowledge of the correspondence between bits and RBGs, assertion of a given bit is sufficient to notify a given UE 102 of its resource allocation in a given sub-frame.

The base station 104c may also create an array (also referred to as a vector herein). Each indexed location in the array may identify a different asserted bit in the bitmap—in other words, the length of the array may equal the number of asserted bits in the bitmap (corresponding to the number of allocated RBGs for that aggregation level). Thus, for an array index of 1, that identifies the first allocated bit in the bitmap, for an array index of 5, that identifies the fifth allocated bit in the bitmap, etc. This array is also included in the downlink control message.

The base station 104c may also list each UE identifier selected for the given aggregation level in a list in a field (also referred to herein as a C-RNTI field for illustrative purposes) of the common downlink control message. The base station 104c may take the value that identifies the order in which each UE identifier is placed in the list and store that value in the array elements whose indices correspond to the asserted bits for the given UE 102, which in turn identifies the RBG(s) allocated for that particular UE 102. While referencing order, this may correspond to the actual numbered order in which the UE 102 identifiers are placed in the list. For example, if the UE 102h were assigned to two different RBGs corresponding to the second and fourth asserted bits in the bitmap, then the base station 104c places the UE 102h in the list for that aggregation level's downlink control message, notes the location in the list (e.g., second spot), and then places the value corresponding to the location value (here, 2 for the second spot) in the second and fourth index locations in the array. The base station 104c repeats this for all of the UEs 102 whose allocation is identified with the given aggregation level, e.g. in their scheduled order. The base station 104c then multicasts the downlink control message to those UEs 102 listed in the field of the downlink control message.

A similar result is achieved using the approach described above for the UEs 102 that are presently associated with other aggregation levels. Thus, a single multicast message may identify to multiple UEs 102 which resources they have been allocated for one or more periods of time (e.g., for a subframe). In this manner, the number of data bits used for providing downlink control messages may be noticeably reduced, thereby reducing the signaling overhead used for signaling resource allocation (and/or other parameters).

Figure 2:
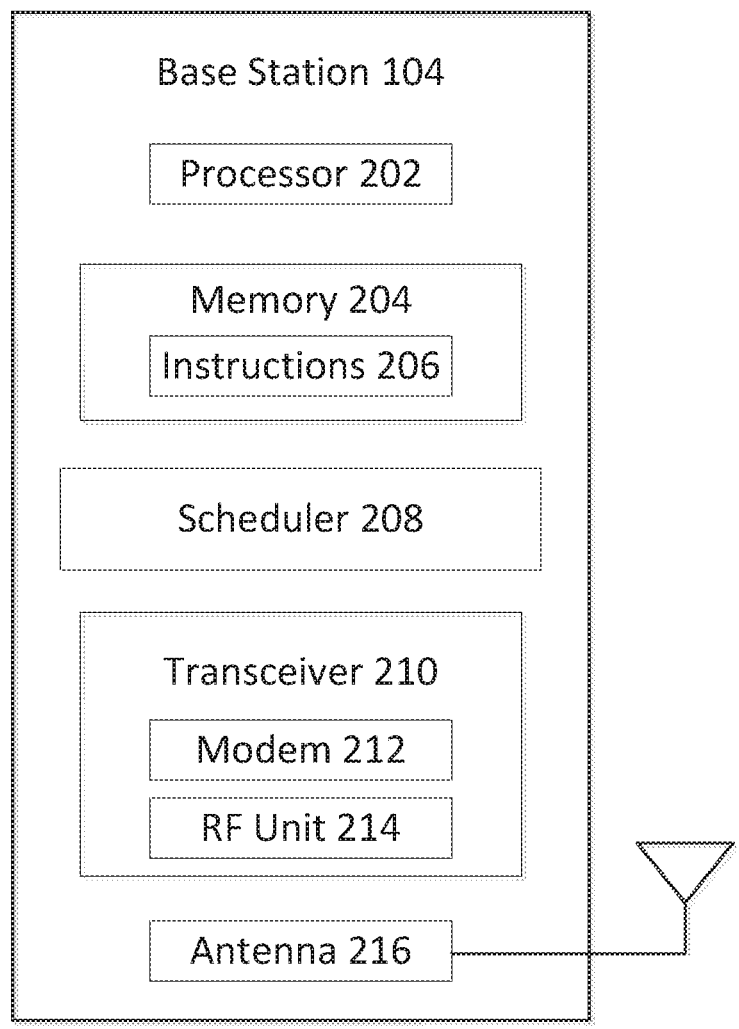
FIG. 2 is a block diagram of an exemplary wireless communication device according to embodiments of the present disclosure.

FIG. 2 is a block diagram of an exemplary wireless communication device 200 according to embodiments of the present disclosure. The wireless communication device 200 may be a base station having any one of many configurations described above. For purposes of example, wireless communication device 200 may be a base station 104 as discussed above with respect to FIG. 1. The base station 104 may include a processor 202, a memory 204, a scheduler 208, a transceiver 210 (including a modem 212 and RF unit 214), and an antenna 216. These elements may be in direct or indirect communication with each other, for example via one or more buses.

The processor 202 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the base stations 104 introduced in FIG. 1 above. The processor 202 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 204 may include a non-transitory computer-readable medium. The memory 204 may store instructions 206. The instructions 206 may include instructions that, when executed by the processor 202, cause the processor 202 to perform operations described herein with reference to a base station 104 in connection with embodiments of the present disclosure. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The scheduler 208 may be used for various aspects of the present disclosure. The scheduler 208 may include various hardware components and/or software components to assist in scheduling resources and informing the scheduled UEs 102 of their assignments. For example, the scheduler 208 may be responsible for common and UE-specific resource allocation assignments, such as the UE-specific resource allocation assignments according to embodiments of the present disclosure. Further, the scheduler 208 may determine what aggregation level any given UE 102 is to be scheduled with. As part of this, the scheduler 208 may determine how many UEs 102 to multi-cast a given downlink control message to at any given aggregation level.

The scheduler 208 may be responsible for generating and maintaining one or more bitmaps, one for each aggregation level, that are used to identify the resources (such as discussed with respect to FIG. 1 above). The scheduler 208 may be further responsible for generating one or more arrays, e.g. one for each aggregation level, that corresponds to the bitmap for that aggregation level as discussed above with respect to FIG. 1. Further, the scheduler 208 may be responsible for generating the list in the field that identifies all of the UEs 102 that the particular downlink control message is multicast to, including placing order numbers in the relevant array elements so that the UEs 102 may properly locate their resource allocation information in the bitmap in the downlink control message, such as discussed above with respect to FIG. 1 and further with respect to additional figures below.

As shown, the transceiver 210 may include the modem subsystem 212 and the radio frequency (RF) unit 214. The transceiver 210 can be configured to communicate bi-directionally with other devices, such as UEs 102 and/or other network elements. The modem subsystem 212 may be configured to modulate and/or encode data according to a MCS, e.g., a LDPC coding scheme, a turbo coding scheme, a convolutional coding scheme, a polar coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 102. Although shown as integrated together in transceiver 210, the modem subsystem 212 and the RF unit 214 may be separate devices that are coupled together at the base station 104 to enable the base station 104 to communicate with other devices.

The RF unit 214 may provide the modulated and/or processed data, e.g. data packets (or, more generally, data messages that may contain one or more data packets and other information) such as the downlink control messages of the present disclosure, to the antenna 216 for transmission to one or more other devices. This may include, for example, transmission of downlink control information in a control channel, such as PDCCH, according to embodiments of the present disclosure. The antenna 216 may further receive data messages transmitted from other devices and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
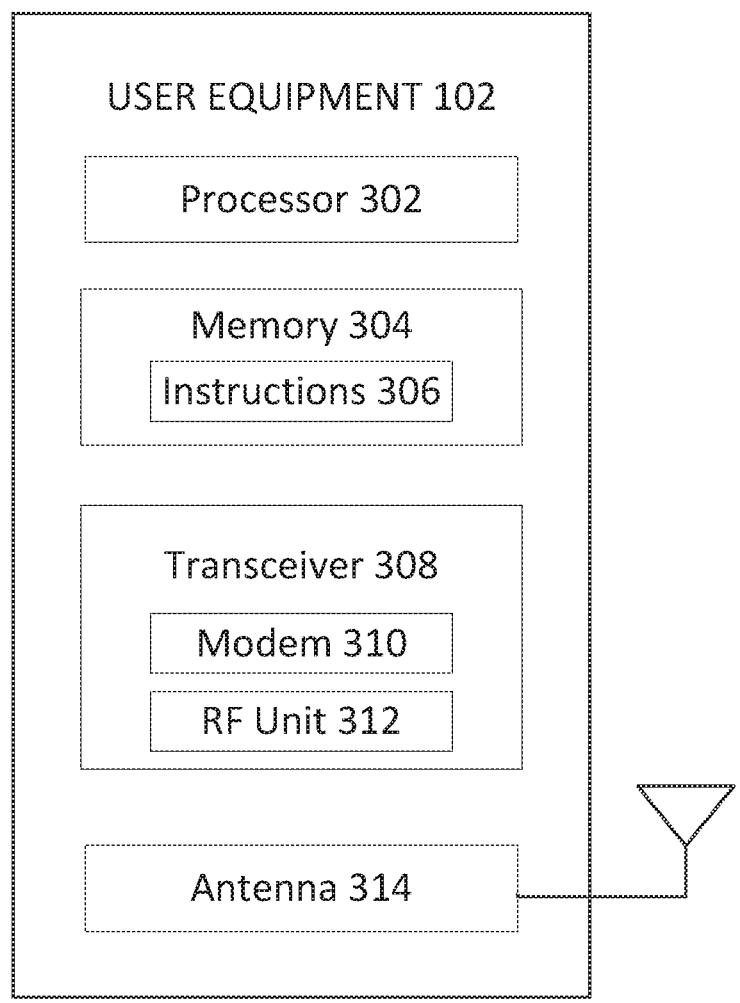
FIG. 3 is a block diagram of an exemplary wireless communication device according to embodiments of the present disclosure.

Turning now to FIG. 3, a block diagram is illustrated of an exemplary wireless communication device 300 according to embodiments of the present disclosure. The wireless communication device 300 may be a UE 102 having any one of many configurations described above. For purposes of example, wireless communication device 300 may be a UE 102 as discussed above with respect to FIG. 1.

As shown, the UE 102 may include a processor 302, a memory 304, a transceiver 308 (including a modem 310 and RF unit 312), and an antenna 314. In some embodiments, the UE 102 may include multiple transceivers 308 (also referred to as multiple radios). These elements may be in direct or indirect communication with each other, for example via one or more buses.

The processor 302 may include a CPU, a DSP, an ASIC, a controller, an FPGA device, another hardware device, a firmware device, or any combination thereof configured to perform the operations described herein with reference to UEs 102. In particular, the processor 302 may be utilized in combination with the other components of the UE 102 to perform the various functions associated with embodiments of the present disclosure. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 102 in connection with embodiments of the present disclosure. Instructions 306 may also be referred to as code, which may be interpreted broadly to include any type of computer-readable statement(s) as discussed above with respect to FIG. 2.

As shown, the transceiver 308 may include the modem subsystem 310 and the radio frequency (RF) unit 312. The transceiver 308 can be configured to communicate bi-directionally with other devices, such as base stations 104. The modem subsystem 310 may be configured to modulate and/or encode data from other aspects of the UE 102, such as processor 302 and/or memory 304, according to an MCS, e.g., a LDPC coding scheme, a turbo coding scheme, a convolutional coding scheme, a polar coding scheme, etc. The RF unit 312 may be configured to process (e.g., perform analog to digital conversion or digital to analog conversion, etc.) modulated/encoded data from the modem subsystem 310 (on outbound transmissions) or of transmissions originating from another source such as a base station 104. Although shown as integrated together in transceiver 308, the modem subsystem 310 and the RF unit 312 may be separate devices that are coupled together at the UE 102 to enable the UE 102 to communicate with other devices.

The RF unit 312 may provide the modulated and/or processed data, e.g. data packets (or, more generally, data messages that may contain one or more data packets and other information), to the antenna 314 for transmission to one or more other devices. This may include, for example, transmission of information on assigned resources received and processed according to embodiments of the present disclosure. The antenna 314 may further receive data messages transmitted from other devices and provide the received data messages for processing and/or demodulation at the transceiver 308. Although FIG. 3 illustrates antenna 314 as a single antenna, antenna 314 may include multiple antennas of similar or different designs in order to sustain multiple transmission links.

For example, according to embodiments of the present disclosure, the transceiver 308 may listen for downlink control messages (e.g., one or more DCIs) during PDCCH portions of subframes. The transceiver 308 may listen for the downlink control messages during multiple different CCE indexes associated with different aggregation levels. Information about multiple aggregation levels may be obtained from those DCIs in CCEs that did not allocate resources for the listening UE 102, such as will be discussed in further detail below with respect to bit reduction.

When the antenna 314 receives a downlink control message, the transceiver 308 may attempt to decode it with the coding rate of the given aggregation level for the given CCE index. In embodiments where the bitmap sizes are the same for each aggregation level, the processor 302 may discard information from the downlink control message where the UE 102 is not listed in the C-RNTI field (or, more generally, the UE identifier field). In embodiments where there is bit reduction, so that the bitmap sizes are not the same for each aggregation level, the processor 302 may store bitmaps for higher aggregation levels for subsequent use, e.g. in memory 304.

Either way, according to embodiments of the present disclosure, when the antenna 314 receives a downlink control message that has been multicast to the UE 102 from the base station 104, the transceiver 308 process the received data so that the processor 302 may access the UE identifier field to locate its particular UE identifier (e.g., C-RNTI or some reduced replacement for that to further optimize bit usage in the downlink message) in the list in that field. For example, the processor 302 may access the UE identifier assigned to the UE 102 and compare it against those provided in the list in the UE identifier field of the downlink control message. Upon locating a matching UE identifier in the list, the processor 302 may at the same time determine the order in which the matching UE identifier was located in the list (e.g., first, second, third, etc.).

The processor 302 also accesses the array included in the downlink control message. As noted above, the array has a length that is equal to the number of asserted bits in the bitmap included with the downlink control message. The processor 302 takes the array and searches through it to find each index location in which the order value obtained from the list has been placed. Thus, if the UE identifier for the UE 102 was found in the second slot in the list, then the processor 302 would search for the order value 2 in the array. At each array element that a match is located (in this example, the value 2), the processor 302 may identify the array index value for that array element.

The processor 302 also accesses the bitmap included in the downlink control message. With the array index value(s) obtained from the array, the processor 302 passes through the bitmap to locate the asserted bit(s) corresponding to the identified array index value(s). For example, if the processor 302 located the value 2 at two separate index locations in the array, such as the fourth and sixth index locations in the array, then the processor 302 can work sequentially through the bitmap to identify the fourth and sixth asserted bits—in other words, when the processor 302 finds the first asserted bit (e.g., "1"), that is the first asserted bit, then the second asserted bit, etc. until it locates the fourth asserted bit. Thus, the array index values may correspond to bits that are much further into the bitmap than the value of the array index.

The processor 302, upon locating the asserted bits in the bitmap that have been identified based on the UE identifier list and the array index values, the processor 302 may identify the resource elements (e.g., RBGs) that are represented by the particular locations in the bitmap. With this information, the UE 102 is then ready to communicate with the allocated resources at the appropriate time and frequencies.

In an embodiment, the base station 104 may communicate the same size of bitmap at each aggregation level. In this situation, the UE 102 may treat each downlink control message at each aggregation level separately (e.g., ignoring those that are not at its aggregation level whether by design or due to the fact that the message was coded at a rate the UE 102 is not currently capable of handling). In another embodiment, bit reduction (also referred to as a super-optimization for bit usage/overhead reduction) may be in use. This occurs where, for each lower aggregation level, the bitmap has been reduced by removing those bits that were asserted for the higher aggregation level(s). Thus, at an aggregation level 4, those bits that were asserted to identify resource allocations for those UEs 102 presently at aggregation level 8 may be removed from the bitmap that is sent with the resource allocations for UEs 102 presently at aggregation level 4. Further, at an aggregation level 2, those bits asserted for aggregation level 8 remain removed and now those bits asserted for aggregation level 4 are removed. Thus, for each lower aggregation level, the size of the bitmap may continue to decrease, reducing the number of bits and therefore signaling overhead for a given multicast.

Where bit reduction is in use (and may be signaled to the UE 102 beforehand that it is), the UE 102 may also pay attention to any higher level aggregation level multicasts. Thus, if a UE 102 is at aggregation level 4, it will listen to both the aggregation level 8 and aggregation level 4 multicasts. This is possible since, in some embodiments of the present disclosure, the downlink control messages at any of the aggregation levels may be transmitted "clear" (e.g., not scrambled according to any values that are inaccessible to some UEs in an environment) so that any of the UEs 102 in a multicast (or others that are waiting for a lower-level multicast) can receive and decode them.

Once the UE 102 that is at aggregation level 4 receives the aggregation level 8 downlink control message, the UE 102 may retrieve the bitmap (referred to for this example as the AL-8 bitmap) and at least temporarily store it in the memory 304. The AL-8 bitmap, being in this example the highest level aggregation level for the system, lists the full range of bits representing the full range of allocable RBGs (or resource elements generally). When the UE 102 receives the aggregation level 4 downlink control message, the UE 102 may retrieve the bitmap (referred to for this example as the AL-4 bitmap) from the message. The UE 102 may access the AL-8 bitmap it is storing in memory 304 and compare the AL-4 bitmap against the AL-8 bitmap. This comparison may be performed after the UE 102 has already identified the relevant bitmap locations in the AL-4 bitmap that represent the resources allocated to the UE 102 (as obtained from the UE identifier list and the array as discussed above).

With this information, the processor 302 may compare the AL-4 bitmap against the AL-8 bitmap in order to identify which bits were removed for the AL-4 bitmap's downlink control message. With any removed bits identified, the processor 302 may then reconstruct the full bitmap with the location of the asserted bits for the UE 102 maintained. In this manner, the UE 102 may then identify its allocated resources for at least the assigned subframe.

Figure 4A:
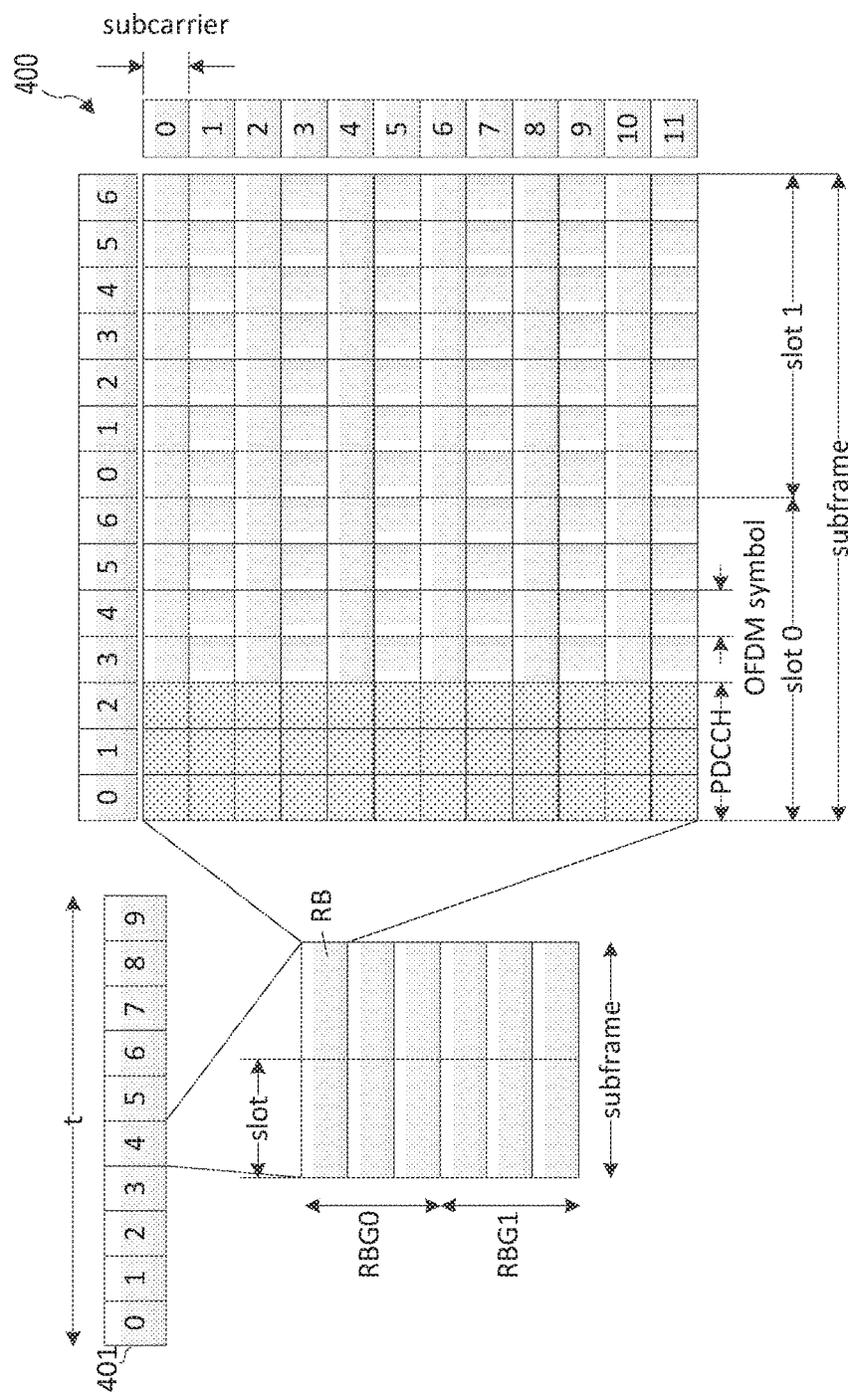
FIG. 4A is a block diagram of an exemplary downlink frame structure according to embodiments of the present disclosure.

FIG. 4A is a block diagram of an exemplary downlink frame structure 400 according to embodiments of the present disclosure. It provides an illustrative example of how a downlink subframe may be organized. A frame 401 may have a duration t (e.g., 10 ms) and may be divided into some number of equally sized subframes (e.g., 10).

Each subframe may include consecutive time slots, such as two. A resource grid may be used to represent two time slots, each time slot including a resource block (RB). Further, multiple RBs (e.g., representing multiple groupings of subcarriers) may be grouped together as the RBGs mentioned above with respect to FIG. 1. The resource grid (illustrated in FIG. 4A with respect to a particular RB) may be divided into multiple resource elements. For a cyclic prefix (e.g., according to LTE), a resource block may contain 12 consecutive subcarriers in the frequency domain and 7 consecutive OFDM symbols in the time domain, for a total of 84 resource elements. For an extended cyclic prefix, an RB may contain 12 consecutive subcarriers in the frequency domain and 6 consecutive OFDM symbols in the time domain, for a total of 72 resource elements.

Some of the resource elements may include DL reference signals (e.g., DL-RS). The DL-RS may include Cell-specific RS (CRS) (also sometimes called common RS) and UE-specific RS (UE-RS), to name some examples. UE-RS may be transmitted only on the resource blocks upon which the corresponding physical DL shared channel (PDSCH) is mapped. The number of bits carried by each resource element depends on the modulation scheme. Thus, the more resource blocks that a UE 102 receives and the higher the modulation scheme, the higher the data rate for the UE 102.

In the illustrated example, several symbols in a subframe may be reserved for use as the PDCCH, and may include a normal cyclic prefix. With this limited size for the PDCCH, the total number of downlink control messages that may be transmitted per a given subframe may be limited by the aggregation level selected for any given downlink control message (e.g., a higher aggregation level increases the size of the downlink control message, thereby reducing the number of downlink control messages that can be transmitted in that subframe's PDCCH).

Figure 4B:
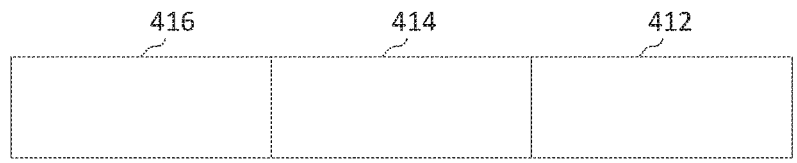
FIG. 4B is a block diagram of an exemplary downlink control message structure according to embodiments of the present disclosure.

An example of a downlink control message is illustrated in FIG. 4B, which provides a block diagram of an exemplary downlink control message structure 410 according to embodiments of the present disclosure. As illustrated in FIG. 4A, the downlink control message structure 410 may include a bitmap 412, an array 414, and a field 416 (also referred to as a list 416, or a UE identifier field or list 416). Other data fields may be included but are not presently illustrated so as not to obscure embodiments of the present disclosure A relationship between the bitmap 412, the array 414, and the list 416 is illustrated in FIG. 4C, which is a block diagram of an exemplary downlink control message structure relationship according to embodiments of the present disclosure.

Figure 4C:
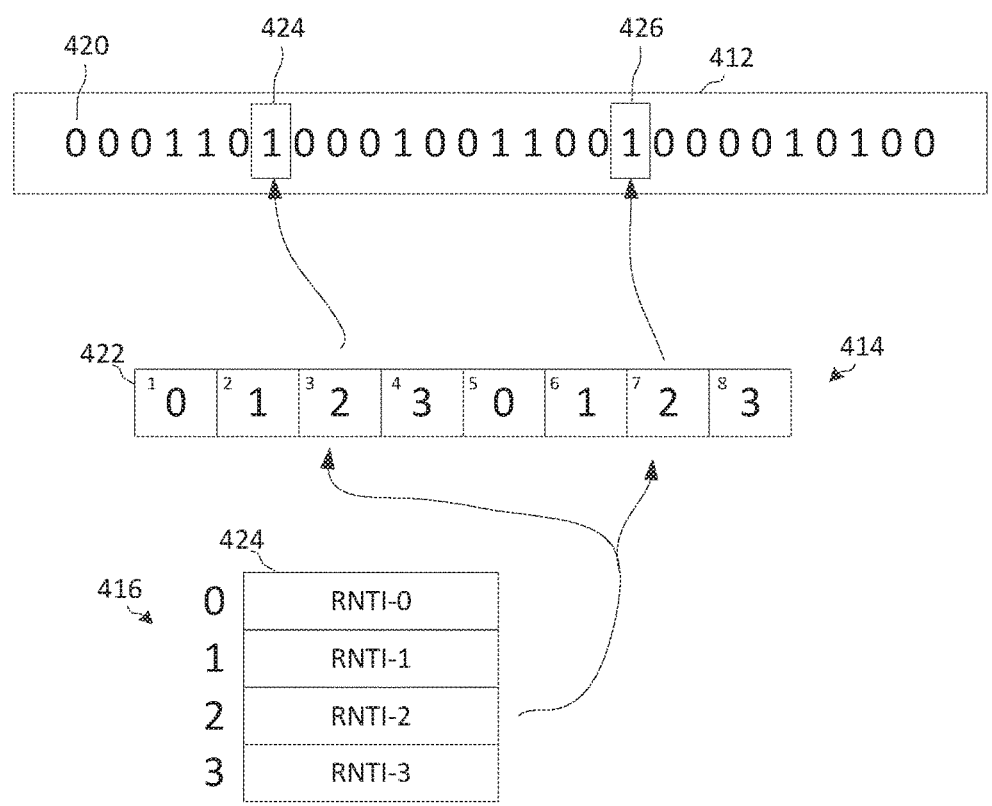
FIG. 4C is a block diagram of an exemplary downlink control message structure according to embodiments of the present disclosure.

As illustrated in FIG. 4C, the bitmap 412 may include a plurality of bit values 420. The series of bit values illustrated in FIG. 4C, and elsewhere (e.g., "0 0 0 1 0 . . . ") is exemplary only. Any given bitmap 412 may have any permutation of 0 and 1. In the illustrated embodiment, "1" is an asserted bit and corresponds to a resource that has been assigned (and that the bit is mapped to at both the base station 104 and the UE 102). Further, the size of the bitmap 412 (as well as the size of the array 414 and the list 416) is exemplary as well—any number of resource elements (e.g., RBGs) may be available and represented via bitmap.

Further, any number of resources may be allocated per aggregation level, and since the array 414's size is based upon the number of bits asserted in the bitmap 412, the size of the array 414 is also variable. In FIG. 4C, the array 414 is illustrated to show that each array element 422 may have its own index value on top of whatever order value is stored in the array element according to embodiments of the present disclosure (indexed starting at 1 in this example, though any other value may be used as well). Further, since the number of UEs 102 that may be assigned resources at a given aggregation level is variable as well, the size of the list 416 may vary to accommodate whatever number of UEs 102 are assigned at that level at that time (since the aggregation level at which a UE 102 is placed may vary as conditions and/or the position of the UE 102 changes).

An example may illustrate the relationship between the bitmap 412, the array 414, and the UE identifier list 416. A particular UE 102 having UE identifier RNTI-2 may be scheduled to have resources allocated to it at a given aggregation level. This is reflected in UE identifier list 416, where RNTI-1, RNTI-2, RNTI-3, and RNTI-4 are all listed as being allocated resources at the same aggregation level. Looking at RNTI-2 specifically, it is listed in order number 2 (indexed from 0 in this example, while in other examples numbering may begin instead from 1). As a result, when looking at the array 414, the order number 2 is searched for throughout the length of the array 414.

In this example, wherever the order number 2 is stored, the index value for that array element is used to map to the bitmap 412. Thus, when a base station 104 creates the array 414 and the values in it for a given aggregation level, it stores the appropriate values corresponding to the order values in array elements whose index values map to the RBG(s) allocated for those respective UEs 102 in that aggregation level. Similarly, when a UE 102 is determining its allocated resources, it looks for the order number to identify locations in the bitmap. Although the order values are illustrated in FIG. 4C as being in a repeating pattern, the order values may be placed in any order that causes the index values for those array elements to point to the correct locations 424/426 in the bitmap 412.

For example, searching for the order number 2 in the array elements 422, in FIG. 4C's example the array index values 3 and 7 correspond to the array elements 422 that store the matching value 2. This means that the RBGs allocated to the UE 102 having the identifier RNTI-2 are identified by the third and seventh asserted bits in the bitmap 412. This is shown with the bits 424 and 426 in bitmap 412—the bit 424 corresponds to the third time that "1" is asserted in this particular bitmap, and the bit 426 corresponds to the seventh time that "1" is asserted in this particular bitmap.

FIG. 5A is a flowchart illustrating bitmap structure per aggregation level according to embodiments of the present disclosure. The bitmap structure in FIG. 5A corresponds to a first embodiment where the bitmap 412 length for each aggregation level corresponds to the number of available resources (in this example, RBGs) for scheduling/allocation. The particular bits 420, both the total amount and their order of asserted/not asserted, as illustrated is exemplary only.

As illustrated, as the highest aggregation level (here, AL-8, or aggregation level 8), the number of bits 420 corresponds to the number of RBGs available for allocation. Thus, the bitmap 412 length equals the number of RBGs overall available for allocation. Further, the length of the UE identifier field may be of ceiling ($\log_2(1+N_{UE_X})$) for each of the RBGs actually used in the given aggregation level (in this example, AL-8). The length of the UE identifier list 416 corresponds to the length for each UE identifier*the total number of UEs allocated for that level. If the actual C-RNTI were used for each UE 102 assigned at aggregation level 8, then the length would increase accordingly to the number of UEs*the length of each C-RNTI.

The length of the overall downlink control message for aggregation level 8 that includes the bitmap 412 would also include the length of the array 414, which corresponds to the number of bits asserted for that aggregation level.

Following a similar pattern for the other aggregation levels illustrated in FIG. 5A, the downlink control messages at aggregation level 4 would include the same length bitmap 412 as was included for aggregation level 8 (e.g., no further optimization is done to the bitmap 412 for aggregation level 4), and similarly for the bitmaps 412 at aggregation levels 2 and 1. The length of the downlink control messages at each level, therefore, becomes a function of the number of UEs 102 whose resource allocations are notified at those levels.

FIG. 5B is a flowchart illustrating bitmap structure per aggregation level according to embodiments of the present disclosure. In this alternative embodiment to that illustrated in FIG. 5A, further bit optimization (in other words, further reducing the number of bits in a given downlink control message) may be obtained, also referred to herein as bit reduction (referring to reducing the number of bits used for a given downlink control message) by further manipulation of the bitmaps 412.

As illustrated, the length of the bitmap 412 at the highest aggregation level, here AL-8, remains the same size as the bitmap 412 illustrated in FIG. 5A (a bit for each RBG available for allocation). This may be optimized at lower aggregation levels. This is illustrated at the next level below AL-8, here AL-4. At AL-4, the bitmap 412 is modified before inclusion in a downlink control message so that those bits that were already asserted are removed from the bitmap 412. After removing those bits that were asserted at the higher aggregation level, the resulting bitmap 412.a is smaller by the number of bits asserted at the higher level (in this example, 8 fewer bits). Thus, the downlink control message for UEs 102 being allocated in aggregation level 4 is reduced by that number of bits, a further optimization.

The example continues at the next lower aggregation level, here AL-2. At aggregation level 2, the base station 104 further removes from the bitmap 412 both those bits that were asserted for aggregation level 8 and for aggregation level 4 (or, alternatively, just from bitmap 412.a). After removing those bits that were asserted at the higher aggregation levels (both AL-8 and AL-4 here), the resulting bitmap 412.b is smaller by the number of bits asserted at the higher level (in this example, 4 fewer bits than bitmap 412.a, and therefore 12 fewer bits than bitmap 412 in total). Thus, the downlink control message for UEs 102 being allocated at aggregation level 2 is reduced by that number of bits, yet a further optimization.

Continuing the example at the next lower aggregation level, here AL-2, the base station 104 further removes from the bitmap 412 those bits that have been asserted at all of the higher aggregation levels (AL-8, AL-4, and AL-2). After removing those bits that were asserted at higher levels, the resulting bitmap 412.c is yet smaller by those number of bits that were asserted at all of the higher levels. In this example, bitmap 412.c is 6 bits less in length than the bitmap 412.b, and therefore 18 fewer bits than bitmap 412 in total. This results in a further optimization.

With this alternative embodiment, as noted above, the UEs 102 that are assigned to lower aggregation levels listen to the downlink control messages of the higher aggregation levels in order to obtain a full picture of the full bitmap 412 in order dynamically obtain their resource allocations according to the other embodiments of the present disclosure (e.g., by mapping from the UE identifier list 416 to the array 414, and from there to the bitmap 412 recovered from the shortened bitmap at the given lower aggregation level).

Figure 6:
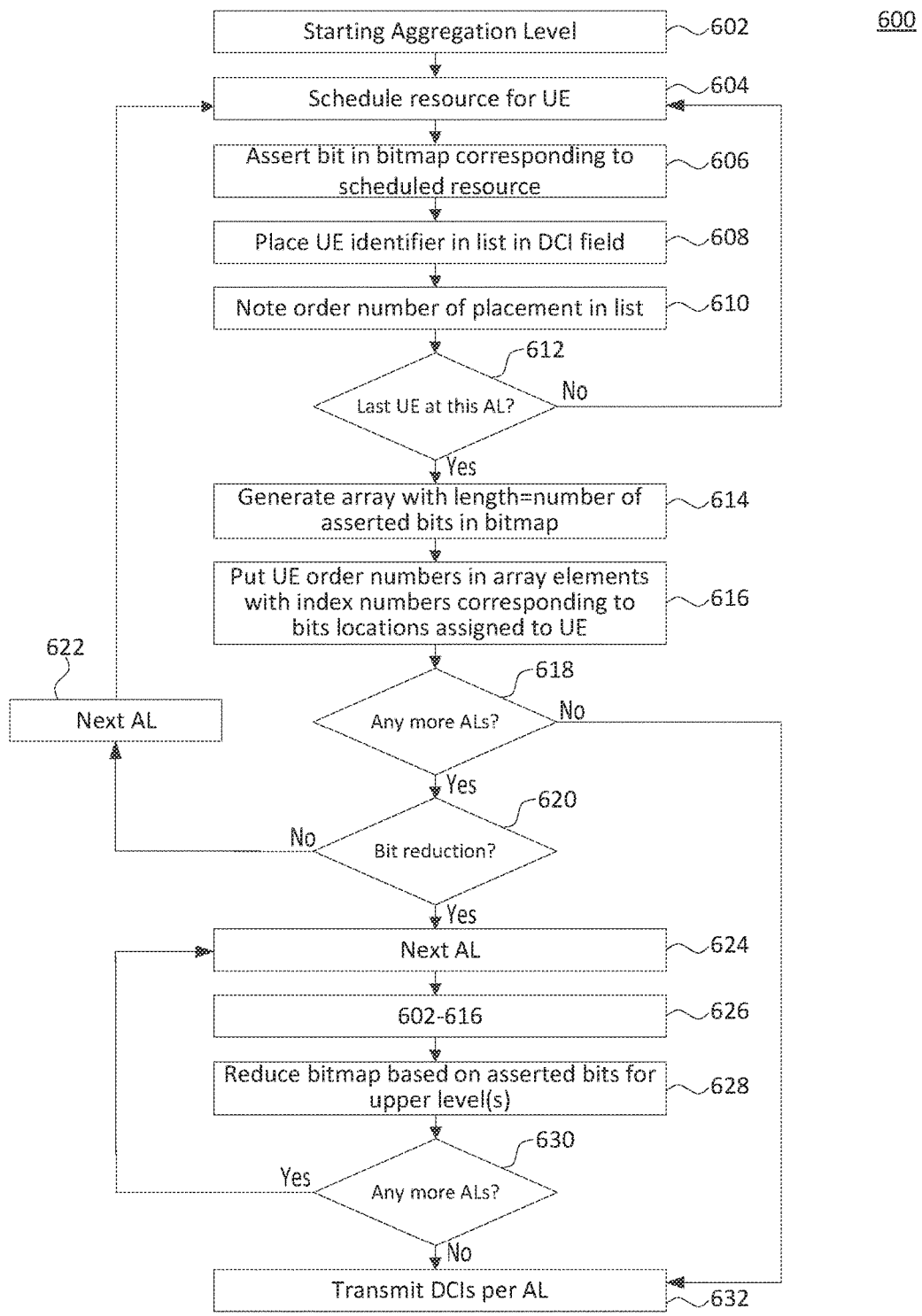
FIG. 6 is a flowchart illustrating an exemplary method for wireless communication in accordance with various aspects of the present disclosure.

Turning now to FIG. 6, a flowchart is illustrated of an exemplary method 600 for wireless communication in accordance with various aspects of the present disclosure. In particular, the method 600 illustrates the creation and transmission of downlink control messages based on scheduled resources according to embodiments of the present disclosure. Method 600 may be implemented by a base station 104 (any number of base stations 104). It is understood that additional steps can be provided before, during, and after the steps of method 600, and that some of the steps described can be replaced or eliminated from the method 600.

At block 602, the base station 104 starts with the first aggregation level, which in embodiments of the present disclosure is the highest aggregation level. For example, the highest level may be aggregation level 8 as discussed above.

At block 604, the base station 104 schedules a resource (or multiple) for a UE 102. This UE 102 is one that has been scheduled for the current aggregation level, for example based on one or more channel quality measures and/or preferences. For example, the resource may be a resource block group that is being allocated for the UE 102.

At block 606, the base station 104 asserts a bit in a bitmap 412 that corresponds to the resource allocated at block 604. The bitmap has a length equal to the total number of resources available for scheduling, with a different bit corresponding to a different RBG. The granularity may be, for example, per RBG (e.g., X number of RBGs available for scheduling in a bandwidth of Y of the system). Assertion of a bit, e.g. to a "1" instead of a "0", identifies that the RBG associated with that particular bit has been allocated at block 604.

At block 608, the base station 104 places a UE identifier in a list 416 in a field that will be included in the downlink control message to potentially multiple UEs 102. In an embodiment, the UE identifier may be a reduced form of a specific identifier, such as the C-RNTI, for example as obtained from $\log_2(1+N*UE_X)$ for the given order of the scheduling for the UE 102 in the current aggregation level. In another embodiment, the UE identifier may be the C-RNTI that is included in the list.

At block 610, the base station 104 notes the order of placement of the UE identifier into the list. This is so that the order number may be stored at one or more locations in an array as discussed with respect to block 614, according to aspects of the present disclosure. Further, the base station 104 notes the RBG allocations and the order in which the different UEs 102 are allocated those RBGs by the asserted bits in the bitmap 412.

At decision block 612, if there are more UEs 102 to schedule at the current aggregation level, then the method 600 returns to block 604 and proceeds as discussed above. This description is for ease of illustration; although the scheduling is described as occurring sequentially, the scheduling may occur concurrently for multiple UEs 102 at a given aggregation level, as well as the modification of the bitmap and/or placements in the list.

If there are no more UEs 102 to schedule at the current aggregation level, then the method 600 proceeds to block 614.

At block 614, the base station 104 generates an array 414 whose length equals the total number of bits asserted in the bitmap 412. Allowing the array 414 to be dynamically sized per aggregation level per round of scheduling provides an optimization in the overall size of the downlink control messaging.

At block 616, the base station 104 places the order numbers for the different UE identifiers placed in the list 416 at block 610 into different array elements 422 of the array 414 according to the order of assignment in the bitmap 412. Thus, if a UE identifier was placed in the second place in the list 416, the base station 104 makes note of this uses the numerical value of 2 to represent the UE 102 in the array 414 (thus achieving a dynamic mapping for this downlink control signal to a further reduced value representing the UE 102, resulting in reduced bit size). Further, based on the noted order of allocation in the bitmap, the base station 104 places the numerical value of 2 at index locations in the array 414 that correspond to the bits representing RBGs allocated to the particular UE 102. For example, the $i^{th}$ index value in the array 414 identifies the $i^{th}$ asserted bit (not overall bits) in the bitmap 412.

At decision block 618, if there are more aggregation levels (e.g., lower aggregation levels from the current aggregation level), then the method 600 proceeds to decision block 620.

At decision block 620, if bit reduction is not being utilized for lower aggregation levels, then the method 600 proceeds to block 622, where the base station 104 transitions to the next aggregation level (e.g., from 8 to 4, 4 to 2, 2 to 1).

If it is instead determined at decision block 620 that bit reduction is being utilized, then the method 600 proceeds to block 624, where the base station 104 transitions to the next aggregation level.

At block 626, the base station 104 proceeds through the actions described above with respect to blocks 602 through 616, including scheduling, asserting bits in the bitmap for the current aggregation level, populating the list, and generating/finalizing the array for the aggregation level for all the UEs 102 scheduled for that aggregation level.

At block 628, the base station 104 reduces the size of the bitmap for the current aggregation level based on the bits asserted for the higher aggregation level(s). For example, at aggregation level 4, the base station 104 removes those bits from the bitmap 412 that were asserted for the bitmap 412 at aggregation level 8. At aggregation level 2, the base station removes those bits from the bitmap 412 that were asserted for the bitmap 412 at aggregation level 8 and those bits that were asserted at aggregation level 4, etc.

At decision block 630, if there are any more lower aggregation levels, then the method 600 returns to block 624 and proceeds as described above. If there are not any more lower aggregation levels, then the method 600 proceeds to block 632, where the downlink control messages for the different aggregation levels are transmitted per their aggregation level (e.g., a CCE index assigned to a given aggregation level). Although described here as transmissions waiting until all aggregation levels have been proceeds for a given subframe, transmission may alternatively occur as each aggregation level's processing is completed at the base station 104. As noted above, various aspects may occur in a different order than that discussed here, for example with respect to blocks 606-616.

Returning to decision block 618, if there are not any more aggregation levels (lower levels) and bit reduction is not being implemented (e.g., the FIG. 5A embodiment is being implemented), then the method 600 proceeds to block 632 as described above.

Figure 7:
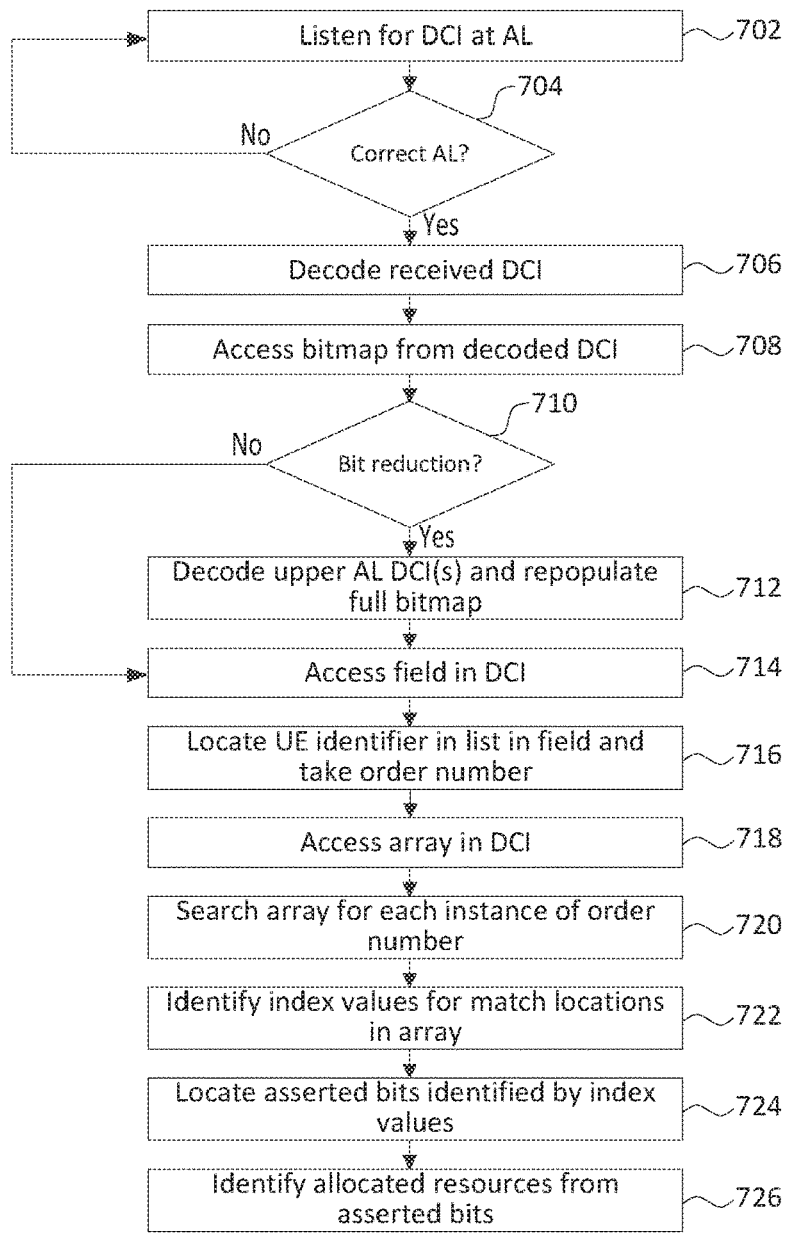
FIG. 7 is a flowchart illustrating an exemplary method for wireless communication in accordance with various aspects of the present disclosure.

Turning now to FIG. 7, a flowchart is illustrated of an exemplary method 700 for wireless communication in accordance with various aspects of the present disclosure. In particular, the method 700 illustrates the reception and processing of downlink control messages based on scheduled resources according to embodiments of the present disclosure. Method 700 may be implemented by a UE 102 (any number of UEs 102). It is understood that additional steps can be provided before, during, and after the steps of method 700, and that some of the steps described can be replaced or eliminated from the method 700.

At block 702, the UE 102 listens for a downlink control message at one or more CCE indexes assigned to one or more aggregation levels. For example, the UE 102 may listen to those CCE index(es) assigned to aggregation level 8 as well as level 4 (e.g., where the UE 102's allocation is included in a downlink control message at aggregation level 4).

At decision block 704, if the UE 102 has not located a UE identifier associated with it (e.g., C-RNTI or a reduced version of C-RNTI), then the method 700 returns to block 702 to listen for the next downlink control message at the next aggregation level (e.g., at a subsequent CCE index).

If, at decision block 704, the UE 102 has received a downlink control message in the current aggregation level that identifies the UE 102 with its identifier, then the method 700 proceeds to block 706.

At block 706, the UE 102 decodes the received downlink control message based on the coding rate for the aggregation level.

At block 708, the UE 102 accesses the bitmap 412 from the decoded downlink control message from block 706.

At decision block 710, if bit reduction is being utilized for lower aggregation levels, then the method 700 proceeds to block 712.

At block 712, the UE 102 decodes the bitmap(s) 412 from the higher aggregation level downlink control messages. For example, whenever the UE 102 receives a downlink control message at block 702 that is not at the proper aggregation level (e.g., is at a higher aggregation level since the higher aggregation levels are transmitted in sequence before the lower levels), it may store it at least temporarily or at least extract the bitmap from each level above the current level for retention. With these higher-level bitmaps 412, the UE 102 repopulates a full bitmap for the current aggregation level.

For example, if the current aggregation level is AL-4, as illustrated in FIG. 5B for bit reduction, the bitmap 412.$a$ is reduced by removal (at the base station 104) of the bits that were asserted for AL-8. Thus, upon receiving the reduced bitmap 412.$a$, the UE 102 accesses the original bitmap 412 from AL-8 to re-integrate those asserted bits for AL-8 that had been removed, so that the UE 102 is able to locate the proper order of asserted bits when determining its resource allocation.

At block 714, the UE 102 accesses the UE identifier field in the downlink control message for the current aggregation level. From this field the UE 102 obtains the UE identifier list 416 as identified in FIGS. 4B and 4C above.

Returning to decision block 710, if bit reduction is not being utilized then the method 700 proceeds to block 714 as described above.

Whether bit reduction is used or not, from block 714 the method 700 proceeds to block 716. At block 716, the UE 102 locates its UE identifier in the UE identifier list 416 and makes note of the order number (also referred to as an order value) in which the UE identifier was placed in the list 416. For example, if the UE 102's identifier was second in the list, then the UE 102 would set an order number of 2. This is used to dynamically map to the proper location in an array 414.

At block 718, the UE 102 accesses the array 414 from the downlink control message for the current aggregation level.

At block 720, the UE 102 searches the array 414 to find array elements that are storing a value that matches the order number obtained for the UE identifier from block 716. This provides a dynamic mapping from the UE identifier to a shorter value so that the downlink control message may be reduced in size.

At block 722, the UE 102 identifies the index values for each array element found to be storing a matching value to the order number obtained for the UE identifier of the UE 102. There may be one or more index values, corresponding to one or more resources being allocated to the UE 102.

At block 724, the UE 102 takes the index values identified from block 722 and locates the asserted bits in the bitmap 412 that represent the resources (e.g., RBGs) allocated to the UE 102. Thus, the numerical value of the index value represents how many asserted bits in from the start of the bitmap 412 to traverse to arrive at the asserted bit which represents the allocated resource corresponding to that index value (e.g., the $i^{th}$ index value in the array 414 identifies the $i^{th}$ asserted bit in the bitmap 412 for the resource). This may repeat for as many index values that are identified from block 720. As noted above, various aspects may occur in a different order than that discussed here, for example with respect to blocks 714-724.

At block 726, the UE 102 identifies the allocated resources (e.g. RBGs) that correspond to the asserted bit (or bits) located at block 724.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a computer-readable medium having program code recorded thereon, the program code comprising code for causing an access point to generate a first downlink control message comprising a first set of resource allocations to a first plurality of wireless communications devices, the first plurality of wireless communications devices being assigned to a first aggregation level. The program code further comprises code for causing the access point to generate a second downlink control message comprising a second set of resource allocations to a second plurality of wireless communications devices, the second plurality of wireless communications devices being assigned to a second aggregation level that is different from the first aggregation level. The program code further comprises code for causing the access point to transmit the first downlink control message to the first plurality of wireless communications devices and the second downlink control message to the second plurality of wireless communications devices.

The computer-readable medium further includes code for causing the access point to include a first bitmap having a first plurality of bits in the first downlink control message, wherein each bit from among the first plurality of bits corresponds to a different resource and an asserted bit in the first bitmap corresponds to a resource allocation from among the first set of resource allocations, and code for causing the access point to include a second bitmap having a second plurality of bits in the second downlink control message, wherein each bit from among the second plurality of bits corresponds to a different resource and an asserted bit in the second bitmap corresponds to a resource allocation from among the second set of resource allocations. The computer-readable medium further includes code for causing the access point to include a first array having a first total number of array elements in the first downlink control message, the first total number of array elements equaling a total number of assigned bits from among the first plurality of bits in the first bitmap, each array element identifying a wireless communications device from the first plurality of wireless communications devices, and code for causing the access point to include a second array having a second total number of array elements in the second downlink control message, the second total number of array elements equaling a total number of assigned bits from among the second plurality of bits in the second bitmap, each array element identifying a wireless communications device from the second plurality of wireless communications devices. The computer-readable medium further includes code for causing the access point to include a first field in the first downlink control message, the first field comprising a first identifier in a list of identifiers for the first plurality of wireless communications devices, and code for causing the access point to include a second field in the second downlink control message, the second field comprising a second identifier in a list of identifiers for the second plurality of wireless communications devices. The computer-readable medium further includes code for causing the access point to place the first identifier in a position in the list of the first field that has a first order value, wherein each position in the list of identifiers in the first field corresponds to a different order value, and code for causing the access point to place the first order value in at least one array element of the first array identifying the wireless communications device from the first plurality of wireless communications devices that identifies at least one assigned bit in the first bitmap that corresponds to at least one resource allocation from among the first set of resource allocations. The computer-readable medium further includes wherein an amount of the first plurality of bits equals an amount of the second plurality of bits. The computer-readable medium further includes wherein an amount of the first plurality of bits is greater than an amount of the second plurality of bits. The computer-readable medium further includes wherein the first plurality of bits comprises a subset of assigned bits to at least one wireless communications device from among the first plurality of wireless communications devices, further comprising code for causing the access point to reduce a length of the second bitmap by removing bit positions from the second bitmap that correspond to the first set of resource allocations represented by the subset of assigned bits in the first bitmap. The computer-readable medium further includes wherein the second plurality of wireless communications devices determine the second set of resource allocations by reconstructing the second bitmap to have a same number of bits as the first bitmap after obtaining the subset of assigned bits from the first bitmap. The computer-readable medium further includes code for causing the access point to assign the first downlink control message to a first index in a downlink control channel, code for causing the access point to assign the second downlink control message to a second index in the downlink control channel, the second index being higher than the first index, and code for causing the access point to transmit the first downlink control message before the second downlink control message based on the assigned first and second indexes.

Embodiments of the present disclosure further include a computer-readable medium having program code recorded thereon, the program code comprising code for causing a wireless communications device to receive a multicast downlink control message to a plurality of wireless communications devices including the wireless communications device according to an aggregation level from an access point. The program code further comprises code for causing the wireless communications device to extract a resource allocation by the access point for the wireless communications device from among a plurality of resource allocations to the plurality of wireless communications devices in the multicast downlink control message. The program code further comprises wherein the aggregation level is one from among a plurality of different aggregation levels.

The computer-readable medium further includes code for causing the wireless communications device to access a bitmap having a plurality of bits, wherein each bit from among the plurality of bits corresponds to a different resource and an asserted bit in a subset of asserted bits from the plurality of bits corresponds to the resource allocation for the wireless communications device. The computer-readable medium further includes code for causing the wireless communications device to access a field in the multicast downlink control message, code for causing the wireless communications device to locate an identifier associated with the wireless communications device from among a list of identifiers, and code for causing the wireless communications device to determine an order value associated with the located identifier. The computer-readable medium further includes code for causing the wireless communications device to access an array comprising a plurality of array elements, each array element being identified in the array by an index value, code for causing the wireless communications device to search for the determined order value in the array, and code for causing the wireless communications device to identify at least one index value corresponding to at least one array element in which the determined order value is located. The computer-readable medium further includes code for causing the wireless communications device to determine which at least one asserted bit from among the subset of asserted bits corresponds to the at least one identified index value, and code for causing the wireless communications device to determine the resource allocation identified by the at least on asserted bit located by the at least one identified index value. The computer-readable medium further includes wherein the multicast downlink control message comprises a second multicast downlink control message, the aggregation level comprises a second aggregation level, and the plurality of wireless communications device comprises a second plurality of wireless communications devices. The computer-readable medium further includes code for causing the wireless communications device to receive a first multicast downlink control message from the access point according to a first aggregation level, and code for causing the wireless communications device to access a first bitmap having a first plurality of bits from the first multicast downlink control message, the bitmap accessed from the second multicast downlink control message comprising a second bitmap having a second plurality of bits. The computer-readable medium further includes wherein each bit from among the first plurality of bits corresponds to a different resource that provides resource allocations to a first plurality of wireless communications devices other than the wireless communications device. The computer-readable medium further includes wherein an amount of the first plurality of bits equals an amount of the second plurality of bits. The computer-readable medium further includes wherein an amount of the first plurality of bits is greater than an amount of the second plurality of bits, the length of the second plurality of bits having been reduced by removal of bit positions in the second plurality of bits that correspond to different resources represented by a subset of assigned bits in the first bitmap. The computer-readable medium further includes code for causing the wireless communications device to identify the subset of assigned bits in the first bitmap, code for causing the wireless communications device to reconstruct the second bitmap to have a same number of bits as the first bitmap based on the identified subset of assigned bits in the first bitmap, and code for causing the wireless communications device to determine the resource allocation based on the reconstructed second bitmap. The computer-readable medium further includes code for causing the wireless communications device to listen for the first multicast downlink control message at an assigned first index in a downlink control channel, and code for causing the wireless communications device to listen for the second multicast downlink control message at an assigned second index in the downlink control channel, the second index being after the first index.

Embodiments of the present disclosure further include an apparatus comprising means for generating a first downlink control message comprising a first set of resource allocations to a first plurality of wireless communications devices, the first plurality of wireless communications devices being assigned to a first aggregation level. The apparatus further comprises means for generating a second downlink control message comprising a second set of resource allocations to a second plurality of wireless communications devices, the second plurality of wireless communications devices being assigned to a second aggregation level that is different from the first aggregation level. The apparatus further comprises means for transmitting the first downlink control message to the first plurality of wireless communications devices and the second downlink control message to the second plurality of wireless communications devices.

The apparatus further includes means for including a first bitmap having a first plurality of bits in the first downlink control message, wherein each bit from among the first plurality of bits corresponds to a different resource and an asserted bit in the first bitmap corresponds to a resource allocation from among the first set of resource allocations, and means for including a second bitmap having a second plurality of bits in the second downlink control message, wherein each bit from among the second plurality of bits corresponds to a different resource and an asserted bit in the second bitmap corresponds to a resource allocation from among the second set of resource allocations. The apparatus further includes means for including a first array having a first total number of array elements in the first downlink control message, the first total number of array elements equaling a total number of assigned bits from among the first plurality of bits in the first bitmap, each array element identifying a wireless communications device from the first plurality of wireless communications devices, and means for including a second array having a second total number of array elements in the second downlink control message, the second total number of array elements equaling a total number of assigned bits from among the second plurality of bits in the second bitmap, each array element identifying a wireless communications device from the second plurality of wireless communications devices. The apparatus further includes means for including a first field in the first downlink control message, the first field comprising a first identifier in a list of identifiers for the first plurality of wireless communications devices, and means for including a second field in the second downlink control message, the second field comprising a second identifier in a list of identifiers for the second plurality of wireless communications devices. The apparatus further includes means for placing the first identifier in a position in the list of the first field that has a first order value, wherein each position in the list of identifiers in the first field corresponds to a different order value, and means for placing the first order value in at least one array element of the first array identifying the wireless communications device from the first plurality of wireless communications devices that identifies at least one assigned bit in the first bitmap that corresponds to at least one resource allocation from among the first set of resource allocations. The apparatus further includes wherein an amount of the first plurality of bits equals an amount of the second plurality of bits. The apparatus further includes wherein an amount of the first plurality of bits is greater than an amount of the second plurality of bits. The apparatus further includes wherein the first plurality of bits comprises a subset of assigned bits to at least one wireless communications device from among the first plurality of wireless communications devices. The apparatus further includes means for reducing a length of the second bitmap by removing bit positions from the second bitmap that correspond to the first set of resource allocations represented by the subset of assigned bits in the first bitmap, wherein the second plurality of wireless communications devices determine the second set of resource allocations by reconstructing the second bitmap to have a same number of bits as the first bitmap after obtaining the subset of assigned bits from the first bitmap. The apparatus further includes means for assigning the first downlink control message to a first index in a downlink control channel, means for assigning the second downlink control message to a second index in the downlink control channel, the second index being higher than the first index, and means for transmitting the first downlink control message before the second downlink control message based on the assigned first and second indexes.

Embodiments of the present disclosure further include an apparatus comprising means for receiving a multicast downlink control message to a plurality of wireless communications devices including the apparatus according to an aggregation level from an access point. The apparatus further comprises means for extracting a resource allocation by the access point for the apparatus from among a plurality of resource allocations to the plurality of wireless communications devices in the multicast downlink control message. The apparatus further comprises wherein the aggregation level is one from among a plurality of different aggregation levels.

The apparatus further includes means for accessing a bitmap having a plurality of bits, wherein each bit from among the plurality of bits corresponds to a different resource and an asserted bit in a subset of asserted bits from the plurality of bits corresponds to the resource allocation for the apparatus. The apparatus further includes means for accessing a field in the multicast downlink control message, means for locating an identifier associated with the apparatus from among a list of identifiers, and means for determining an order value associated with the located identifier. The apparatus further includes means for accessing an array comprising a plurality of array elements, each array element being identified in the array by an index value, means for searching for the determined order value in the array, and means for identifying at least one index value corresponding to at least one array element in which the determined order value is located. The apparatus further includes means for determining which at least one asserted bit from among the subset of asserted bits corresponds to the at least one identified index value, and means for determining the resource allocation identified by the at least on asserted bit located by the at least one identified index value. The apparatus further includes wherein the multicast downlink control message comprises a second multicast downlink control message, the aggregation level comprises a second aggregation level, and the plurality of wireless communications device comprises a second plurality of wireless communications devices. The apparatus further includes means for receiving, prior to the second multicast downlink control message, a first multicast downlink control message from the access point according to a first aggregation level, and means for accessing, by the wireless communications device, a first bitmap having a first plurality of bits from the first multicast downlink control message, the bitmap accessed from the second multicast downlink control message comprising a second bitmap having a second plurality of bits. The apparatus further includes wherein each bit from among the first plurality of bits corresponds to a different resource that provides resource allocations to a first plurality of wireless communications devices other than the wireless communications device. The apparatus further includes wherein an amount of the first plurality of bits equals an amount of the second plurality of bits. The apparatus further includes wherein an amount of the first plurality of bits is greater than an amount of the second plurality of bits, the length of the second plurality of bits having been reduced by removal of bit positions in the second plurality of bits that correspond to different resources represented by a subset of assigned bits in the first bitmap. The apparatus further includes means for identifying the subset of assigned bits in the first bitmap, means for reconstructing the second bitmap to have a same number of bits as the first bitmap based on the identified subset of assigned bits in the first bitmap, and means for determining the resource allocation based on the reconstructed second bitmap. The apparatus further includes means for listening for the first multicast downlink control message at an assigned first index in a downlink control channel, and means for listening for the second multicast downlink control message at an assigned second index in the downlink control channel, the second index being after the first index.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method, comprising:
   generating, by an access point, a first downlink control message comprising a first set of resource allocations to a first plurality of wireless communications devices based on the first plurality of wireless communications devices being assigned to a first aggregation level;
   generating, by the access point, a second downlink control message comprising a second set of resource allocations to a second plurality of wireless communications devices based on the second plurality of wireless communications devices being assigned to a second aggregation level that is different from the first aggregation level; and
   transmitting, from the access point, the first downlink control message to the first plurality of wireless communications devices and the second downlink control message to the second plurality of wireless communications devices.

2. The method of claim 1, further comprising:
   including, by the access point, a first bitmap having a first plurality of bits in the first downlink control message, wherein each bit from among the first plurality of bits corresponds to a different resource and an asserted bit in the first bitmap corresponds to a resource allocation from among the first set of resource allocations; and
   including, by the access point, a second bitmap having a second plurality of bits in the second downlink control message, wherein each bit from among the second plurality of bits corresponds to a different resource and an asserted bit in the second bitmap corresponds to a resource allocation from among the second set of resource allocations.

3. The method of claim 2, further comprising:
   including, by the access point, a first array having a first total number of array elements in the first downlink control message, the first total number of array elements equaling a total number of assigned bits from among the first plurality of bits in the first bitmap, each array element identifying a wireless communications device from the first plurality of wireless communications devices; and
   including, by the access point, a second array having a second total number of array elements in the second downlink control message, the second total number of array elements equaling a total number of assigned bits from among the second plurality of bits in the second bitmap, each array element identifying a wireless communications device from the second plurality of wireless communications devices.

4. The method of claim 3, further comprising:
   including, by the access point, a first field in the first downlink control message, the first field comprising a first identifier in a list of identifiers for the first plurality of wireless communications devices; and
   including, by the access point, a second field in the second downlink control message, the second field comprising a second identifier in a list of identifiers for the second plurality of wireless communications devices.

5. The method of claim 4, further comprising:
   placing, by the access point, the first identifier in a position in the list of the first field that has a first order value, wherein each position in the list of identifiers in the first field corresponds to a different order value; and
   placing, by the access point, the first order value in at least one array element of the first array identifying the wireless communications device from the first plurality of wireless communications devices that identifies at least one assigned bit in the first bitmap that corresponds to at least one resource allocation from among the first set of resource allocations.

6. The method of claim 2, wherein an amount of the first plurality of bits is greater than an amount of the second plurality of bits.

7. The method of claim 6, wherein the first plurality of bits comprises a subset of assigned bits to at least one wireless communications device from among the first plurality of wireless communications devices, the method further comprising:
   reducing, by the access point, a length of the second bitmap by removing bit positions from the second bitmap that correspond to the first set of resource allocations represented by the subset of assigned bits in the first bitmap,
   wherein the second plurality of wireless communications devices determine the second set of resource allocations by reconstructing the second bitmap to have a same number of bits as the first bitmap after obtaining the subset of assigned bits from the first bitmap.

8. The method of claim 1, further comprising:
assigning, by the access point, the first downlink control message to a first index in a downlink control channel;
assigning, by the access point, the second downlink control message to a second index in the downlink control channel, the second index being higher than the first index; and
transmitting, by the access point, the first downlink control message before the second downlink control message based on the assigned first and second indexes.

9. A method, comprising:
receiving, at a wireless communications device, a multicast downlink control message to a plurality of wireless communications devices including the wireless communications device according to an aggregation level from an access point; and
extracting, by the wireless communications device, a resource allocation by the access point for the wireless communications device from among a plurality of resource allocations to the plurality of wireless communications devices in the multicast downlink control message,
wherein the aggregation level is one from among a plurality of different aggregation levels, the resource allocation based on the wireless communications device being assigned to the aggregation level.

10. The method of claim 9, wherein the extracting further comprises:
accessing, by the wireless communications device, a bitmap having a plurality of bits, wherein each bit from among the plurality of bits corresponds to a different resource and an asserted bit in a subset of asserted bits from the plurality of bits corresponds to the resource allocation for the wireless communications device.

11. The method of claim 10, wherein the extracting further comprises:
accessing, by the wireless communications device, a field in the multicast downlink control message;
locating, by the wireless communications device, an identifier associated with the wireless communications device from among a list of identifiers; and
determining, by the wireless communications device, an order value associated with the located identifier.

12. The method of claim 11, wherein the extracting further comprises:
accessing, by the wireless communications device, an array comprising a plurality of array elements, each array element being identified in the array by an index value;
identifying, by the wireless communications device, at least one index value corresponding to at least one array element in which the determined order value is located;
determining, by the wireless communications device, the asserted bit from among the subset of asserted bits that corresponds to the at least one identified index value; and
determining, by the wireless communications device, the resource allocation identified by the asserted bit located by the at least one identified index value.

13. The method of claim 10, wherein the multicast downlink control message comprises a second multicast downlink control message, the aggregation level comprises a second aggregation level, and the plurality of wireless communications devices comprises a second plurality of wireless communications devices, the method further comprising:
receiving, prior to the second multicast downlink control message, a first multicast downlink control message from the access point according to a first aggregation level; and
accessing, by the wireless communications device, a first bitmap having a first plurality of bits from the first multicast downlink control message, the bitmap accessed from the second multicast downlink control message comprising a second bitmap having a second plurality of bits,
wherein each bit from among the first plurality of bits corresponds to a different resource that provides resource allocations to a first plurality of wireless communications devices other than the wireless communications device.

14. The method of claim 13, wherein an amount of the first plurality of bits is greater than an amount of the second plurality of bits, the amount of the second plurality of bits having been reduced by removal of bit positions in the second plurality of bits that correspond to different resources represented by a subset of assigned bits in the first bitmap.

15. The method of claim 14, further comprising:
identifying, by the wireless communications device, the subset of assigned bits in the first bitmap;
reconstructing, by the wireless communications device, the second bitmap to have a same number of bits as the first bitmap based on the identified subset of assigned bits in the first bitmap; and
determining, by the wireless communications device, the resource allocation based on the reconstructed second bitmap.

16. An apparatus, comprising:
a processor configured to:
generate a first downlink control message comprising a first set of resource allocations to a first plurality of wireless communications devices based on the first plurality of wireless communications devices being assigned to a first aggregation level; and
generate a second downlink control message comprising a second set of resource allocations to a second plurality of wireless communications devices based on the second plurality of wireless communications devices being assigned to a second aggregation level that is different from the first aggregation level; and
a transceiver configured to transmit the first downlink control message to the first plurality of wireless communications devices and the second downlink control message to the second plurality of wireless communications devices.

17. The apparatus of claim 16, wherein the processor is further configured to:
include a first bitmap having a first plurality of bits in the first downlink control message, wherein each bit from among the first plurality of bits corresponds to a different resource and an asserted bit in the first bitmap corresponds to a resource allocation from among the first set of resource allocations; and
include a second bitmap having a second plurality of bits in the second downlink control message, wherein each bit from among the second plurality of bits corresponds to a different resource and an asserted bit in the second bitmap corresponds to a resource allocation from among the second set of resource allocations.

18. The apparatus of claim 17, wherein the processor is further configured to:

include a first array having a first total number of array elements in the first downlink control message, the first total number of array elements equaling a total number of assigned bits from among the first plurality of bits in the first bitmap, each array element identifying a wireless communications device from the first plurality of wireless communications devices; and include a second array having a second total number of array elements in the second downlink control message, the second total number of array elements equaling a total number of assigned bits from among the second plurality of bits in the second bitmap, each array element identifying a wireless communications device from the second plurality of wireless communications devices.

19. The apparatus of claim 18, wherein the processor is further configured to:

include a first field in the first downlink control message, the first field comprising a first identifier in a list of identifiers for the first plurality of wireless communications devices; and include a second field in the second downlink control message, the second field comprising a second identifier in a list of identifiers for the second plurality of wireless communications devices.

20. The apparatus of claim 19, wherein the processor is further configured to:

place the first identifier in a position in the list of the first field that has a first order value, wherein each position in the list of identifiers in the first field corresponds to a different order value; and place the first order value in at least one array element of the first array identifying the wireless communications device from the first plurality of wireless communications devices that identifies at least one assigned bit in the first bitmap that corresponds to at least one resource allocation from among the first set of resource allocations.

21. The apparatus of claim 17, wherein an amount of the first plurality of bits is greater than an amount of the second plurality of bits.

22. The apparatus of claim 21, wherein the first plurality of bits comprises a subset of assigned bits to at least one wireless communications device from among the first plurality of wireless communications devices, the processor being further configured to:

reduce a length of the second bitmap by removing bit positions from the second bitmap that correspond to the first set of resource allocations represented by the subset of assigned bits in the first bitmap, wherein the second plurality of wireless communications devices determine the second set of resource allocations by reconstructing the second bitmap to have a same number of bits as the first bitmap after obtaining the subset of assigned bits from the first bitmap.

23. The apparatus of claim 16, wherein:

the processor is further configured to assign the first downlink control message to a first index in a downlink control channel, the processor is further configured to assign the second downlink control message to a second index in the downlink control channel, the second index being higher than the first index, the transceiver is further configured to transmit the first downlink control message before the second downlink control message based on the assigned first and second indexes, and the apparatus comprises an access point and the wireless communications devices each comprise a user equipment.

24. An apparatus, comprising:

a transceiver configured to receive a multicast downlink control message to a plurality of wireless communications devices including the apparatus according to an aggregation level from an access point; and a processor configured to extract a resource allocation by the access point for the apparatus from among a plurality of resource allocations to the plurality of wireless communications devices in the multicast downlink control message, wherein the aggregation level is one from among a plurality of different aggregation levels, the resource allocation based on the apparatus being assigned to the aggregation level.

25. The apparatus of claim 24, wherein the processor is further configured to:

access a bitmap having a plurality of bits, wherein each bit from among the plurality of bits corresponds to a different resource and an asserted bit in a subset of asserted bits from the plurality of bits corresponds to the resource allocation for the apparatus.

26. The apparatus of claim 25, wherein the processor is further configured to:

access a field in the multicast downlink control message;

locate an identifier associated with the apparatus from among a list of identifiers; and determine an order value associated with the located identifier.

27. The apparatus of claim 26, wherein the processor is further configured to:

access an array comprising a plurality of array elements, each array element being identified in the array by an index value;

identify at least one index value corresponding to at least one array element in which the determined order value is located;

determine the asserted bit from among the subset of asserted bits that corresponds to the at least one identified index value; and determine the resource allocation identified by the asserted bit located by the at least one identified index value.

28. The apparatus of claim 25, wherein:

the multicast downlink control message comprises a second multicast downlink control message, the aggregation level comprises a second aggregation level, and the plurality of wireless communications devices comprises a second plurality of wireless communications devices, the transceiver is further configured to receive, prior to the second multicast downlink control message, a first multicast downlink control message from the access point according to a first aggregation level, the processor is further configured to access a first bitmap having a first plurality of bits from the first multicast downlink control message, the bitmap accessed from the second multicast downlink control message comprising a second bitmap having a second plurality of bits, and each bit from among the first plurality of bits corresponds to a different resource that provides resource allocations to a first plurality of wireless communications devices other than the apparatus.

29. The apparatus of claim 28, wherein an amount of the first plurality of bits is greater than an amount of the second plurality of bits, the amount of the second plurality of bits having been reduced by removal of bit positions in the second plurality of bits that correspond to different resources represented by a subset of assigned bits in the first bitmap.

30. The apparatus of claim 29, wherein the processor is further configured to:
- identify the subset of assigned bits in the first bitmap;
- reconstruct the second bitmap to have a same number of bits as the first bitmap based on the identified subset of assigned bits in the first bitmap; and
- determine the resource allocation based on the reconstructed second bitmap.

* * * * *